US012116474B2

(12) United States Patent
Satou et al.

(10) Patent No.: US 12,116,474 B2
(45) Date of Patent: Oct. 15, 2024

(54) POLAR GROUP-CONTAINING OLEFIN COPOLYMER

(71) Applicants: JAPAN POLYETHYLENE CORPORATION, Tokyo (JP); JAPAN POLYPROPYLENE CORPORATION, Tokyo (JP)

(72) Inventors: Tomohiko Satou, Mie (JP); Masahiro Uematsu, Saitama (JP); Yoshika Yamada, Mie (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 603 days.

(21) Appl. No.: 17/425,111

(22) PCT Filed: Jan. 27, 2020

(86) PCT No.: PCT/JP2020/002856
§ 371 (c)(1),
(2) Date: Jul. 22, 2021

(87) PCT Pub. No.: WO2020/158688
PCT Pub. Date: Aug. 6, 2020

(65) Prior Publication Data
US 2022/0106471 A1   Apr. 7, 2022

(30) Foreign Application Priority Data

Jan. 28, 2019 (JP) ................................ 2019-012097

(51) Int. Cl.
| | | |
|---|---|---|
| C08F 210/02 | (2006.01) | |
| C08F 4/70 | (2006.01) | |
| C08F 4/80 | (2006.01) | |
| C08F 210/06 | (2006.01) | |
| C08F 210/16 | (2006.01) | |
| C08F 210/18 | (2006.01) | |
| C08F 220/06 | (2006.01) | |
| C08F 220/18 | (2006.01) | |
| C08L 23/08 | (2006.01) | |
| C08F 220/26 | (2006.01) | |
| C08F 220/28 | (2006.01) | |

(52) U.S. Cl.
CPC ........ *C08L 23/0815* (2013.01); *C08F 210/02* (2013.01); *C08F 210/16* (2013.01); *C08F 220/06* (2013.01); *C08F 220/1804* (2020.02); *C08L 23/0869* (2013.01); *C08F 4/7031* (2013.01); *C08F 220/26* (2013.01); *C08F 220/282* (2020.02); *C08F 220/283* (2020.02); *C08F 2810/50* (2013.01)

(58) Field of Classification Search
CPC .......................... C08F 210/02; C08F 220/06;
C08F 220/1804; C08F 220/26; C08F
220/281; C08F 220/282; C08F 220/283;
C08F 2810/50; C08F 4/7031
See application file for complete search history.

(56) References Cited

U.S. PATENT DOCUMENTS

| | | | |
|---|---|---|---|
| 3,264,272 A | | 8/1966 | Rees et al. |
| 3,903,203 A | * | 9/1975 | Trieschmann ...... C08L 23/0869 |
| | | | 525/227 |
| 3,971,690 A | * | 7/1976 | Birnkraut ............. B32B 15/043 |
| | | | 526/318 |
| 4,554,320 A | * | 11/1985 | Reimann ................. C08L 77/00 |
| | | | 525/183 |
| 4,772,673 A | * | 9/1988 | Hobes .................... C10L 1/195 |
| | | | 526/316 |
| 4,956,418 A | | 9/1990 | Tanaka et al. |
| 5,059,662 A | | 10/1991 | Wikelski et al. |
| 6,562,779 B2 | * | 5/2003 | Wittkowski ............... C08F 8/44 |
| | | | 526/194 |
| 11,168,166 B2 | * | 11/2021 | Kobayashi ............ C08F 222/02 |
| 2011/0028658 A1 | | 2/2011 | Tanaka et al. |
| 2016/0046842 A1 | * | 2/2016 | Uematsu ................. B32B 27/10 |
| | | | 428/513 |
| 2017/0002120 A1 | | 1/2017 | Sato et al. |

(Continued)

FOREIGN PATENT DOCUMENTS

| | | | | | |
|---|---|---|---|---|---|
| EP | 0015561 A1 | * | 9/1980 | ................ | C08J 5/12 |
| GB | 1357439 A | * | 6/1974 | ............. | C08L 23/04 |
| JP | 47-023490 | | 10/1972 | | |
| JP | 48-011388 | | 2/1973 | | |
| JP | 52-135392 | | 11/1977 | | |
| JP | 52-135392 A | * | 11/1977 | ................ | C08F 8/44 |
| JP | 53-57295 A | * | 5/1978 | ................ | C08F 8/12 |
| JP | S53-057295 A | | 5/1978 | | |
| JP | 58-187445 | | 11/1983 | | |
| JP | 63-186710 | | 8/1988 | | |

(Continued)

OTHER PUBLICATIONS

Office Action issued in Japanese Patent Application No. 2020-011197, Aug. 29, 2023, translation.

(Continued)

*Primary Examiner* — Rip A Lee
(74) *Attorney, Agent, or Firm* — GREENBLUM & BERNSTEIN, P.L.C.

(57) ABSTRACT

Provided is a polar group-containing multi-component olefin copolymer comprising: structural units (A) derived from ethylene or an α-olefin; structural units (B) having a carboxyl group or a structure which forms a carboxyl group by an elimination reaction due to heat or an acid; and structural units (C) derived from acrylic acid, which do not have a carboxyl group, and which do not cause an elimination reaction due to heat or an acid under the same conditions as those for the elimination reaction due to heat or an acid in which the structural units (B) form a carboxyl group.

14 Claims, 1 Drawing Sheet

(56) References Cited

U.S. PATENT DOCUMENTS

2017/0306134 A1 10/2017 Hattori et al.
2020/0385502 A1 12/2020 Kobayshi et al.

FOREIGN PATENT DOCUMENTS

| JP | 2009132898 A | * | 6/2009 | ............ C08F 210/00 |
| JP | 2012201657 A | * | 10/2012 | ................ C07F 9/50 |
| JP | 2013043979 A | * | 3/2013 | ................ C08F 4/80 |
| JP | 2015028164 A | * | 2/2015 | ............. B32B 15/08 |
| JP | 2015-163691 | | 9/2015 | |
| JP | 2016-79408 | | 5/2016 | |
| JP | 2018-165364 | | 10/2018 | |
| WO | 2009/123138 | | 10/2009 | |

OTHER PUBLICATIONS

ISR issued in WIPO Patent Application No. PCT/JP2020/002856, Apr. 14, 2020, English translation.

* cited by examiner

POLAR GROUP-CONTAINING OLEFIN COPOLYMER

FIELD OF THE INVENTION

The present invention relates to a polar group-containing olefin copolymer, particularly, a copolymer which can be used in producing an ionomer, and which has excellent balance of various physical properties, such as a tensile modulus, a tensile stress at break, a tensile elongation at break, a tensile impact strength, a crystallinity, and a phase angle, and a method for producing the same.

BACKGROUND ART

An ethylene ionomer is a resin having an ethylene-unsaturated carboxylic acid copolymer as a base resin which is intermolecular bonded with ions of a metal, such as sodium or zinc. The ethylene ionomer has features such that it not only is tough and elastic but also is flexible and has a wear resistance and transparency (U.S. Pat. No. 3,264,272 specification). As a commercially available ethylene-methacrylic acid copolymer, "Nucrel (registered trademark)" that Dupont Co. has developed has been known, and, as an ethylene ionomer, "Surlyn (registered trademark)" that Dupont Co. has developed, which is a sodium salt or zinc salt of an ethylene-methacrylic acid copolymer, and others have been known.

With respect to the ethylene-unsaturated carboxylic acid copolymer used as a base resin for a conventionally known ethylene ionomer, specifically, an ethylene-unsaturated carboxylic acid copolymer obtained by subjecting ethylene and a polar group-containing monomer, such as (meth)acrylic acid, to polymerization by a high-pressure radical polymerization method is used (Japanese Unexamined Patent Publication Nos. Sho 47-23490, Sho 48-11388, and Sho 63-186710). However, the ethylene-unsaturated carboxylic acid copolymer produced by a high-pressure radical polymerization method has a molecular structure having a large amount of long-chain branches and short-chain branches irregularly arranged, and hence has a disadvantage in that the strength is unsatisfactory.

Meanwhile, as another method for producing the ethylene-unsaturated carboxylic acid copolymer used as a base resin for an ethylene ionomer, there has been reported a method in which a copolymer of ethylene and t-butyl acrylate is produced using a late transition metal catalyst (Japanese Unexamined Patent Publication No. 2015-163691), and the obtained polar group-containing olefin copolymer is subjected to heat or acid treatment to modify the copolymer to an ethylene-acrylic acid copolymer (Japanese Unexamined Patent Publication No. 2016-79408).

Further, as a method for producing an ethylene-unsaturated carboxylic acid copolymer used as a base resin for an ionomer having high rigidity, a method in which maleic anhydride is graft-modified on an ethylene-cyclic olefin copolymer (COC) has been reported (International Patent Publication No. 2009/123138).

PRIOR ART REFERENCES

Patent Documents

Patent document 1: U.S. Pat. No. 3,264,272 specification
Patent document 2: Japanese Unexamined Patent Publication No. Sho 47-23490
Patent document 3: Japanese Unexamined Patent Publication No. Sho 48-11388
Patent document 4: Japanese Unexamined Patent Publication No. Sho 63-186710
Patent document 5: Japanese Unexamined Patent Publication No. 2015-163691
Patent document 6: Japanese Unexamined Patent Publication No. 2016-79408
Patent document 7: International Patent Publication No. 2009/123138

SUMMARY OF THE INVENTION

Problems to be Solved by the Invention

An ionomer generally has excellent physical properties, such as moldability, compatibility with a pigment, rigidity, and transparency. For example, an ionomer is advantageously used as a material, such as a packaging material, and therefore studies are made on a method for synthesizing a copolymer used for the production of an ionomer. However, in the method described in Japanese Unexamined Patent Publication No. 2016-79408, the α-olefin-unsaturated carboxylic acid copolymer produced using a transition metal catalyst is used as a base resin, and hence an ionomer having excellent thermal physical properties and mechanical strength and others is obtained, but the obtained polymer has high crystallinity, causing a problem in that the transparency is poor.

With respect to the ethylene ionomer using the ethylene-acrylic acid copolymer described in the Examples of Japanese Unexamined Patent Publication No. 2016-79408 as a base resin, the transparency can be controlled by appropriately selecting the crystallinity, but the crystallinity and the rigidity have a trade-off relationship and, when the crystallinity is reduced for improving the transparency, the rigidity is lowered, and thus there is a problem in that it is difficult to achieve excellent balance between the transparency, rigidity, and toughness.

On the method described in International Patent Publication No. 2009/123138, it is extremely difficult to produce an α-olefin-unsaturated carboxylic acid copolymer having a large amount of maleic anhydride by graft modification, and hence the method has a disadvantage in that the obtained α-olefin-unsaturated carboxylic acid copolymer has a small acid content. In actual, the copolymer described in the Examples of International Patent Publication No. 2009/123138 has a maleic anhydride content as small as 0.7 to 1.4 wt % (0.5 to 1 mol %). For this reason, the ethylene ionomer using such a graft modified copolymer as a base resin has only a small amount of polar sites in the copolymer, and hence has a drawback in that the balance between the rigidity, toughness, and transparency is unsatisfactory. Further, it is considered that the amount of reaction sites with metal ions is small such that the obtained ionomer cannot satisfactorily exhibit the expected toughness and elasticity. Moreover, the base resin for an ethylene ionomer used in the Examples of International Patent Publication No. 2009/123138 contains a cyclic olefin in an amount as large as 21 to 35 mol %, and therefore has a disadvantage in that it has a high glass transition temperature (Tg) and thus is too hard.

An ionomer inherits most of the properties of an α-olefin-unsaturated carboxylic acid copolymer (acid copolymer) as a base resin for the ionomer, and therefore obtaining an acid copolymer having excellent physical properties or a polar group-containing olefin copolymer which is the copolymer before modified leads to obtaining an ionomer having excellent physical properties. However, such a copolymer which itself has excellent physical properties and which can be used in producing an ionomer has not yet been obtained. Accordingly, a subject of the present invention is to provide an α-olefin-unsaturated carboxylic acid copolymer or polar group-containing olefin copolymer having excellent balance of physical properties, such as crystalline properties, rigidity, and toughness.

Means for Solving the Problems

The present inventors have conducted extensive and intensive studies with a view toward solving the above-mentioned problems. As a result, it has been found that the multi-component copolymer which has components having at least three types of properties and which has introduced thereinto structural units derived from a polar group-containing olefin monomer that does not cause an elimination reaction due to heat or an acid has an improved balance between the tensile modulus, tensile stress at break, tensile elongation at break, tensile impact strength, crystallinity, and phase angle, and the present invention has been completed.

Specifically, the first embodiment of the present invention is a polar group-containing multi-component olefin copolymer comprising: structural units (A) derived from ethylene or an α-olefin; structural units (B) having a carboxyl group or a structure which forms a carboxyl group by an elimination reaction due to heat or an acid; and structural units (C) derived from acrylic acid, which do not have a carboxyl group, and which do not cause an elimination reaction due to heat under the same conditions as those for the elimination reaction due to heat or an acid in which the structural units (B) form a carboxyl group.

Effects of the Invention

In the present invention, there can be provided a copolymer having an improved balance between the tensile modulus, tensile stress at break, tensile elongation at break, tensile impact strength, crystallinity, and phase angle. The polar group-containing multi-component olefin copolymer of the present invention is a material advantageous not only in that the copolymer itself can be used as a material, but also in that the copolymer can be used in producing an ionomer having more excellent physical properties than conventional.

MODE FOR CARRYING OUT THE INVENTION

Figure 1:
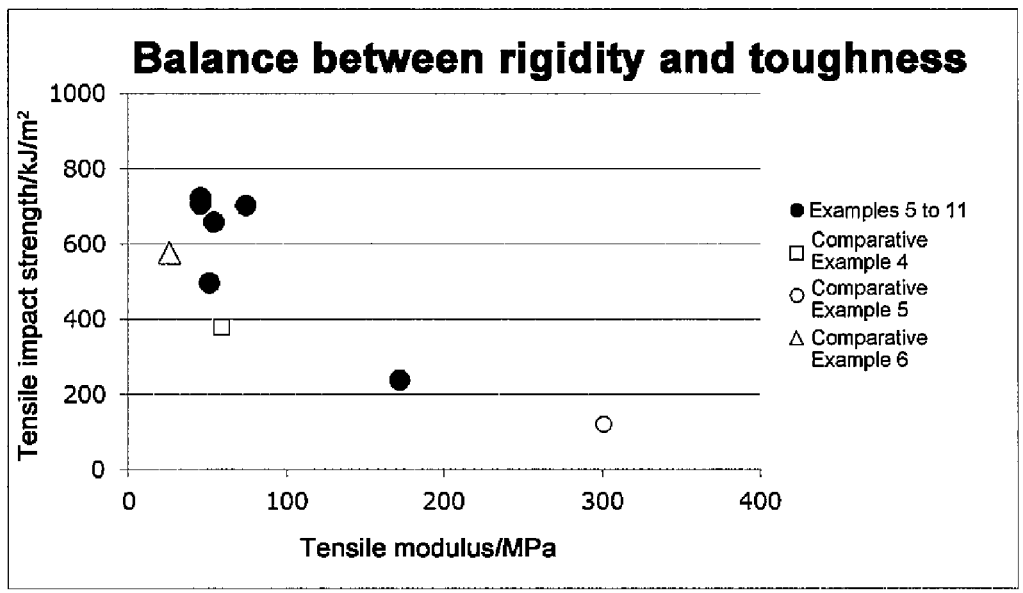
FIG. 1 A diagram showing a balance between the rigidity and the toughness with respect to the copolymers in the Examples and Comparative Examples.

An embodiment of the present invention is, as mentioned above, a polar group-containing multi-component olefin copolymer comprising: structural units (A) derived from ethylene or an α-olefin; structural units (B) having a carboxyl group or a structure which forms a carboxyl group by an elimination reaction due to heat or an acid; and structural units (C) derived from acrylic acid, which do not have a carboxyl group, and which do not cause an elimination reaction due to heat under the same conditions as those for the elimination reaction due to heat or an acid in which the structural units (B) form a carboxyl group. Hereinbelow, the constituent monomers for the polymer, the catalyst component, the method for producing the copolymer, and others will be described in detail.

In the following description, the term "polymerization" collectively means homopolymerization for a single monomer and copolymerization for a plurality of monomers, and, in the present specification, the copolymerization is frequently described merely as "polymerization". The present invention relates to a polymer, but the structure of the polymer itself cannot be unconditionally specified generally using, e.g., a chemical formula. Therefore, in the present specification, in the description concerning the polymer, if necessary, the polymer is described using a method for producing the polymer.

In the present specification, the range of values indicated using the preposition "to" means a range of values including the respective values shown before and after the preposition "to" as the lower limit and the upper limit. Further, in the present specification, if necessary, a hydrocarbon group is indicated using, for example, "R" having no superscript. The hydrocarbon group generally includes a group comprised of carbon and hydrogen, and, for example, there can be mentioned linear or branched alkyl groups, such as methyl, ethyl, and t-butyl, groups having an unsaturated bond, such as vinyl, cyclic groups, such as cyclopentyl, cyclohexyl, and norbornyl, and aromatic groups, such as phenyl and naphthyl, but, in the description of the individual contexts, when any of the above groups is particularly excluded, this is clearly described. Further, the "hydrocarbon group" means a monovalent substituent, such as an alkyl group or a phenyl group, unless otherwise specified, but, when a valence is apparent in context or when a valence is clearly described, the valence of the hydrocarbon group is according to the description.

(1) Structural Units (A)

Structural units (A) are at least one type of structural units selected from the group consisting of structural units derived from ethylene and structural units derived from an α-olefin.

With respect to the α-olefin in the present disclosure, more preferred is an α-olefin having 3 to 20 carbon atoms and being represented by the structural formula: $CH_2=CHR^d$ (wherein $R^d$ is a hydrocarbon group having 1 to 18 carbon atoms, and may be of a linear chain structure or have a branch). An α-olefin having 3 to 12 carbon atoms is more preferred.

Specific examples of monomers from which structural units (A) are derived include ethylene, propylene, 1-butene, 1-pentene, 1-hexene, 1-octene, 1-decene, 3-methyl-1-butene, and 4-methyl-1-pentene, and the monomer may be ethylene.

The structural units may be of a single type or of two or more types.

Examples of combinations of two types of structural units (A) include ethylene-propylene, ethylene-1-butene, ethylene-1-hexene, ethylene-1-octene, propylene-1-butene, propylene-1-hexene, and propylene-1-octene.

Examples of combinations of three types of structural units (A) include ethylene-propylene-1-butene, ethylene-propylene-1-hexene, ethylene-propylene-1-octene, propylene-1-butene-hexene, and propylene-1-butene-1-octene.

In the present disclosure, the monomer from which structural units (A) are derived preferably essentially contains ethylene and, if necessary, may further contain one or more types of α-olefins having 3 to 20 carbon atoms. In this case, the proportion of ethylene contained in the monomer from which structural units (A) are derived may be 65 to 100 mol %, and may be 70 to 100 mol %, based on the total mole of structural units (A).

(2) Structural Units (B)

Structural units (B) are structural units derived from a monomer having a carboxyl group or a structure which forms a carboxyl group by an elimination reaction due to heat or an acid.

The carboxyl group or the structure which forms a carboxyl group by an elimination reaction due to heat or an acid is bonded to any of carbon atoms constituting the principal chain of the polar group-containing multi-component olefin copolymer of the present invention, except the molecular chain end. Accordingly, the monomer from which structural units (B) are derived is a monomer having a structure which serves as a reaction site for polymerization, such as a carbon-carbon double bond, and a carboxyl group or a structure which forms a carboxyl group by an elimination reaction due to heat or an acid, which is bonded to the carbon atom of the above structure. The structure which serves as a reaction site for polymerization is preferably a carbon-carbon double bond, more preferably a vinyl group ($H_2C=CH-$). Further, in the polar group-containing multi-component olefin copolymer of the present invention, the carboxyl group or structure which forms a carboxyl group by an elimination reaction due to heat or an acid in structural units (B) is positioned in the side chain of the copolymer.

Structural units (B) have a structure which forms a carboxyl group by an elimination reaction due to heat or an acid. The "elimination reaction" is preferably a deprotection reaction for ester. By virtue of this, an α-olefin-unsaturated carboxylic acid copolymer for use as a base resin for an ionomer can be obtained from the polar group-containing multi-component olefin copolymer of the present invention. Thus, with respect to the conditions for obtaining an α-olefin-unsaturated carboxylic acid copolymer, there is no particular limitation as long as the conditions are reaction conditions used in general deprotection for ester. With respect to the heat or an acid which corresponds to the reaction conditions for the elimination reaction, the conditions and reagents generally employed can be used. Conditions for the elimination reaction, such as a temperature and reagents, are well known by those skilled in the art, and reference is made to the examples shown below and these can be appropriately employed in combination.

When the polar group-containing multi-component olefin copolymer of the present invention is subjected to elimination reaction due to heat, the reaction temperature may be a temperature at which structural units (B) form a carboxylic acid, and, when the heating temperature is too low, the ester is not converted to a carboxylic acid, and, when the heating temperature is too high, decarbonylation or decomposition of the copolymer proceeds. Therefore, the heating temperature in the present invention is preferably in the range of from 80 to 350° C., more preferably 100 to 340° C., further preferably 150 to 330° C., further more preferably 200 to 320° C.

The reaction time varies depending on, e.g., the heating temperature or the reactivity of structural units (B), but is generally 1 minute to 50 hours, more preferably 2 minutes to 30 hours, further preferably 2 minutes to 10 hours, still further preferably 2 minutes to 3 hours, especially preferably 3 minutes to 2 hours.

In the above step, with respect to the atmosphere for reaction, there is no particular limitation, but generally, the reaction is preferably conducted in an inert gas flow. As an example of inert gas, a nitrogen, argon, or carbon dioxide atmosphere can be used, and a small amount of oxygen or air may be mixed into inert gas. As a reaction medium, a solvent can be used. With respect to the solvent, there is no particular limitation as long as it is an inert solvent under the conditions for the present reaction, and any solvent can be used. When a solvent is used, the upper limit of the reaction temperature is preferably the boiling point of the solvent used. Toluene having a boiling point in the above-mentioned range of preferred reaction temperature is preferably used.

With respect to the reactor used in the above step, there is no particular limitation as long as the copolymer can be substantially uniformly stirred by the method, and a glass vessel or an autoclave (AC) equipped with a stirrer may be used, and any conventionally known kneading machine, such as Brabender Plastograph, a single-screw or twin-screw extruder, an intensive screw type kneading machine, a Banbury mixer, a kneader, or a roll, can be used.

As an additive for promoting the elimination reaction due to heat, a conventionally known acid or base catalyst may be used. With respect to the acid or base catalyst, there is no particular limitation, but, for example, a hydroxide of an alkali metal or an alkaline earth metal, such as sodium hydroxide, potassium hydroxide, or lithium hydroxide, a carbonate of an alkali metal or an alkaline earth metal, such as sodium hydrogencarbonate or sodium carbonate, a solid acid, such as montmorillonite, an inorganic acid, such as hydrochloric acid, nitric acid, or sulfuric acid, or an organic acid, such as formic acid, acetic acid, benzoic acid, citric acid, paratoluenesulfonic acid, trifluoroacetic acid, or trifluoromethanesulfonic acid, can be appropriately used. From the viewpoint of the reaction promotion effect, cost, corrosion of the apparatus and others, preferred are sodium hydroxide, potassium hydroxide, sodium carbonate, and paratoluenesulfonic acid, and paratoluenesulfonic acid is more preferred.

When the polar group-containing multi-component olefin copolymer of the present invention is subjected to elimination reaction due to an acid, a conventionally known acid can be used. With respect to the acid catalyst, there is no particular limitation, but, for example, a solid acid, such as montmorillonite, an inorganic acid, such as hydrochloric acid, nitric acid, or sulfuric acid, or an organic acid, such as formic acid, acetic acid, benzoic acid, citric acid, paratoluenesulfonic acid, trifluoroacetic acid, or trifluoromethanesulfonic acid, can be appropriately used.

From the viewpoint of the reaction promotion effect, cost, corrosion of the apparatus and others, paratoluenesulfonic acid is preferred, and paratoluenesulfonic acid is more preferred.

The temperature for conducting an elimination reaction due to an acid may be a temperature at which the ester is converted to a carboxylic acid, and, when the temperature is too low, the ester is not converted to a carboxylic acid, and, when the temperature is too high, decarbonylation or decomposition of the copolymer proceeds. Therefore, the heating temperature in the present invention is preferably in the range of from 20 to 250° C., more preferably 50 to 200° C., further preferably 60 to 150° C., especially preferably 70 to 140° C., further more preferably 80 to 130° C., further especially preferably 90 to 120° C.

The reaction time for conducting an elimination reaction due to an acid varies depending on, e.g., the temperature or the reactivity of an ester group portion, but is generally 1 minute to 50 hours, more preferably 2 minutes to 30 hours, further preferably 2 minutes to 10 hours, still further preferably 2 minutes to 7 hours, especially preferably 3 minutes to 5 hours.

In the above step, with respect to the atmosphere for reaction, there is no particular limitation, but generally, the reaction is preferably conducted in an inert gas flow. As an example of inert gas, nitrogen, argon, or carbon dioxide can be used. A small amount of oxygen or air may be mixed into inert gas.

With respect to the reactor used in the above step, there is no particular limitation as long as the copolymer can be substantially uniformly stirred by the method, and a glass vessel or an autoclave (AC) equipped with a stirrer may be used, and any conventionally known kneading machine, such as Brabender Plastograph, a single-screw or twin-screw extruder, an intensive screw type kneading machine, a Banbury mixer, a kneader, or a roll, can be used.

A preferred mode of structural units (B) is at least one type of structural units selected from the group consisting of structural units (b-1) derived from a polar group-containing olefin monomer represented by the following general formula (1), and structural units (b-2) derived from a polar group-containing olefin monomer represented by the following general formula (2).

$$H_2C=CH-T^1 \qquad (1)$$

Wherein, in the general formula (1), $T^1$ is:
a carboxyl group,
an alkoxycarbonyl group having 2 to 20 carbon atoms and being substituted with at least one carboxyl group,
a hydrocarbon group having 1 to 30 carbon atoms and being substituted with at least one carboxyl group,
an alkoxy group having 1 to 20 carbon atoms and being substituted with at least one carboxyl group,
an acyloxy group having 1 to 20 carbon atoms and being substituted with at least one carboxyl group,
a substituted amino group having 1 to 12 carbon atoms and being substituted with at least one carboxyl group, or
a substituted silyl group having 1 to 18 carbon atoms and being substituted with at least one carboxyl group.

In the general formula (1), $T^1$ is a carboxyl group structure.

$$H_2C=CH-X-COOT^2 \qquad (2)$$

Wherein, in the general formula (2), $T^2$ is a substituent selected from the group consisting of:
a t-butyl group,
an allyl group,
a benzyl group, and
a group represented by: —$CR^aR^b$—O—$R^c$ (wherein $R^a$ is a hydrogen atom or a hydrocarbon group having 1 to 10 carbon atoms, and each of $R^b$ and $R^c$ is a hydrocarbon group having 1 to 10 carbon atoms, wherein $R^b$ and $R^c$ optionally together form a divalent hydrocarbon group having 1 to 8 carbon atoms and optionally having at least one methylene group replaced by an ether group or an ester group, and each of $R^b$ and $R^c$ optionally has a hydrocarbon substituent having 1 to 4 carbon atoms); and X is a direct bond or —COO—R'— (wherein R' is a divalent hydrocarbon group having 1 to 30 carbon atoms).

In the general formula (2), $T^2$ is a structure which forms a carboxyl group by an elimination reaction due to heat or an acid.

In the monomer represented by the general formula (1) above, with respect to the structure of $T^1$ which is not a carboxyl group, namely, with respect to the structure of an alkoxycarbonyl group having 2 to 20 carbon atoms, a hydrocarbon group having 1 to 30 carbon atoms, an alkoxy group having 1 to 20 carbon atoms, an acyloxy group having 1 to 20 carbon atoms, a substituted amino group having 1 to 12 carbon atoms, or a substituted silyl group having 1 to 18 carbon atoms, each being substituted with at least one carboxyl group, there is no particular limitation as long as the group is substituted with at least one carboxyl group and satisfies the requirement for the number of carbon atoms. Further, with respect to the position at which the structure is substituted with a carboxyl group, there is no particular limitation. When an ionomer is produced, a reaction with metal ions is likely to occur, and therefore it is preferred that the structure is substituted with a carboxyl group at the end of the structure.

With respect to the alkoxycarbonyl group, hydrocarbon group, alkoxy group, acyloxy group, substituted amino group, and substituted silyl group for $T^1$, the carbon skeleton of the group may have a branch, a ring, and/or an unsaturated bond. The ring may be an aromatic ring. The carbon skeleton may be substituted with at least one halogen, such as chlorine, fluorine, or bromine, hydroxyl group, silyl group, or amino group, and may contain at least one ether bond (—O—), ester bond, carbonyl group (C=O), or group having a heteroatom, such as an amino group.

With respect to the number of carbon atoms of the alkoxycarbonyl group (—COOR) for $T^1$, the lower limit may be 2 or more, and the upper limit may be 20 or less, and may be 15 or less.

With respect to the number of carbon atoms of the hydrocarbon group (R—) for $T^1$, the lower limit may be 1 or more, and the upper limit may be 30 or less, and may be 10 or less.

With respect to the number of carbon atoms of the alkoxy group (RO—) for $T^1$, the lower limit may be 1 or more, and the upper limit may be 20 or less, and may be 10 or less. R may be an aromatic ring, and accordingly, the alkoxy group for $T^1$ includes a structure of a phenol.

With respect to the number of carbon atoms of the acyloxy group (RCOO—) for $T^1$, the lower limit may be 2 or more, and the upper limit may be 20 or less, and may be 10 or less.

With respect to the number of carbon atoms of the substituted amino group for $T^1$, which is the amino group ($R_2N$—) that is not substituted with a carboxyl group, the lower limit may be 1 or more, in terms of the total number of carbon atoms of two R's, and may be 2 or more, and the upper limit may be 12 or less, in terms of the total number of carbon atoms of two R's, and may be 9 or less. For example, two R's may have a combination of an undecyl group (having 11 carbon atoms) and a methyl group (having 1 carbon atom). In the amino group, each of two R's may be independently a substituent having 1 to 6 carbon atoms, and the substituents may have the same carbon skeleton or different carbon skeletons, and any one of the substituents may be a hydrogen atom. The substituent may have a structure such that oxygen is directly bonded to nitrogen to form hydroxyamine or a hydroxyamine derivative. In other words, the amino group may contain a hydroxyl group or an alkoxy group as R. As unlimited examples of the amino group which is not substituted with a carboxyl group, there can be mentioned a dimethylamino group, a diethylamino group, a di-n-propylamino group, a cyclohexylamino group, a dodecylamino group, and N,O-dimethylhydroxyamino.

With respect to the number of carbon atoms of the substituted silyl group for $T^1$, which is the silyl group ($R_3Si$—) that is not substituted with a carboxyl group, the lower limit may be 1 or more, in terms of the total number of carbon atoms of three R's, and may be 3 or more, and the upper limit may be 18 or less, in terms of the total number of carbon atoms of three R's, and may be 12 or less. For example, three R's may have a combination of a hexadecyl group (having 16 carbon atoms) and two methyl groups (having 1 carbon atom). In the substituted silyl group, each of three R's may be independently a substituent having 1 to 6 carbon atoms, and the substituents may have the same carbon skeleton or different carbon skeletons, and, when at least one R has a substituent having 1 to 6 carbon atoms, the remaining R or R's may be a hydrogen atom. The substituent may have a structure such that oxygen is directly bonded to silicon to form hydroxysilyl or an alkoxysilyl group. In other words, the silyl group may contain a hydroxyl group or an alkoxy group as R. As unlimited examples of the silyl group which is not substituted with a carboxyl group, there can be mentioned a trimethylsilyl group, a triethylsilyl group, a tri-n-propylsilyl group, a dimethylphenylsilyl group, a methyldiphenylsilyl group, and a triphenylsilyl group.

As unlimited examples of the preferred monomer from which structural units (b-1) are derived, there can be mentioned the compounds shown below. Based on these examples and the above-mentioned definition, those skilled in the art can determine a structure of the monomer from which structural units (b-1) are derived, irrespective of the examples shown below.

[Chemical formula 1-1]

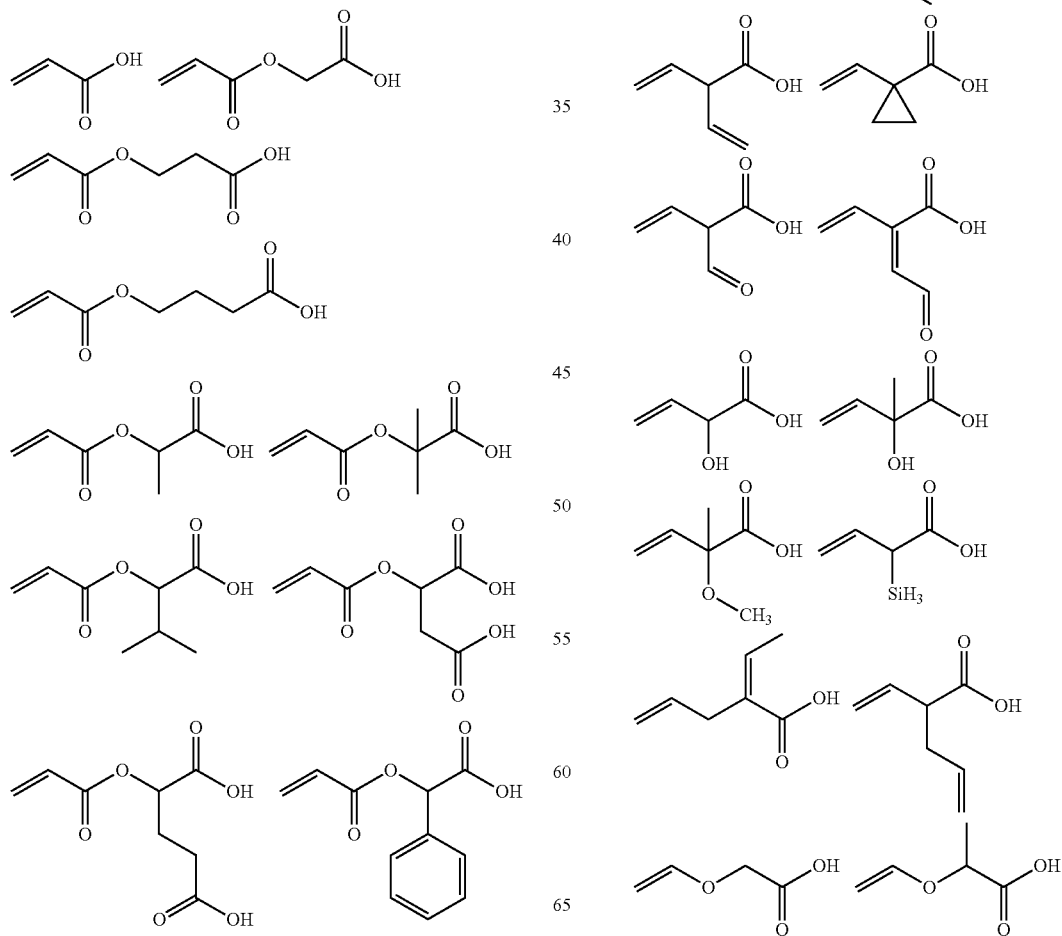

-continued

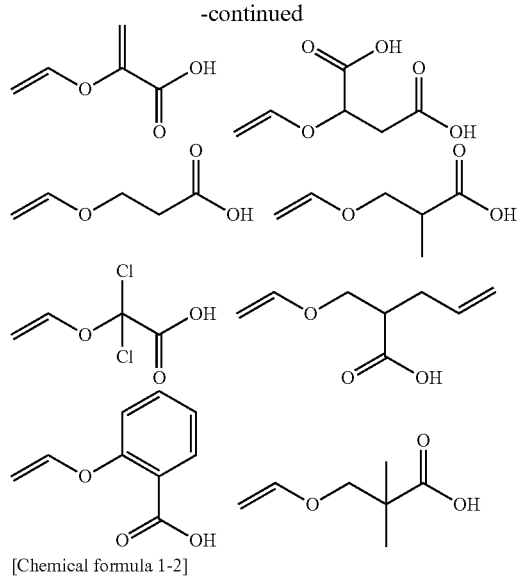
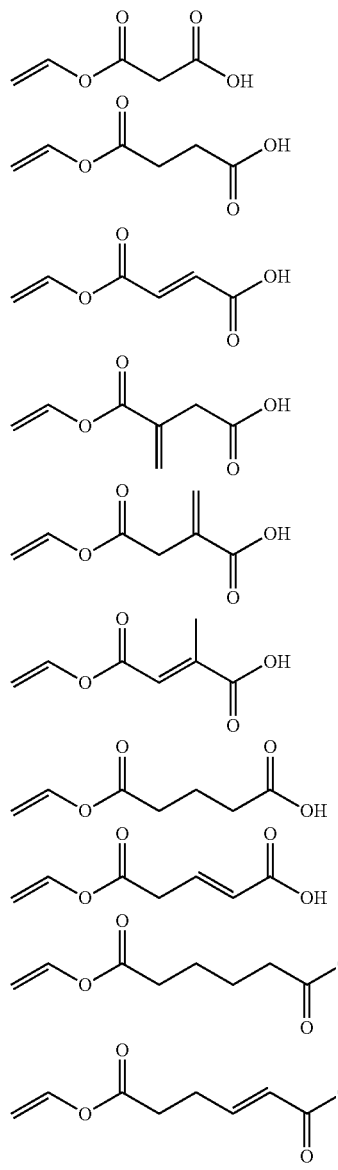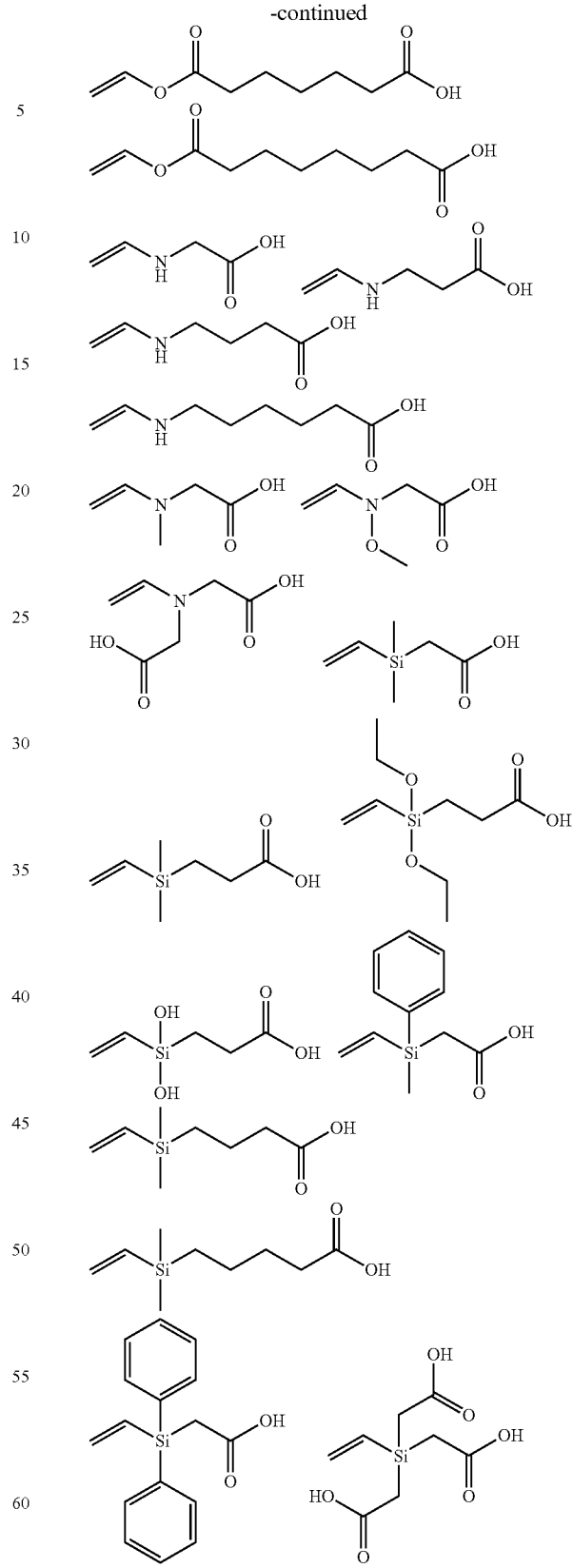
A preferred mode of structural units (B) is structural units (b-2) derived from a polar group-containing olefin monomer represented by the general formula (2) above. The general formula (2) is represented by $H_2C=CH-X-COOT^2$, wherein $T^2$ is a substituent selected from the group consisting of a t-butyl group, an allyl group, a benzyl group, and a group represented by: $-CR^aR^b-O-R^c$ (wherein $R^a$, $R^b$, and $R^c$ are as defined above), and X is a direct bond or $-COO-R'-$ (wherein R' is a divalent hydrocarbon group having 1 to 30 carbon atoms). That is, structural unit (b-2) as a preferred mode is the monomer derived from acrylic acid of the general formula (2) wherein group $T^2$ is present as a protecting group for ester, particularly the monomer derived from acrylic acid substituted with the group $T^2$. A more preferred mode of structural units (B) is structural units derived from a polar group-containing olefin monomer represented by the general formula (2) wherein $T^2$ is a substituent selected from the group consisting of a t-butyl group and a group represented by: $-CR^aR^b-O-R^c$ (wherein $R^a$ to $R^c$ are as defined above), and X is a direct bond. Further more preferred structural units (B) are structural units derived from a polar group-containing olefin monomer represented by the general formula (2) wherein $T^2$ is a t-butyl group and X is a direct bond, i.e., structural units derived from t-butyl acrylate.

A t-butyl group, an allyl group, and a benzyl group for $T^2$ are a functional group used as a protecting group for ester. A t-butyl group is a protecting group which can undergo deprotection under strong acid conditions, an allyl group is a protecting group which can undergo deprotection in the presence of a Pd catalyst, and a benzyl group is a protecting group which can undergo deprotection under hydrolytic conditions for ester.

Group $-CR^aR^b-O-R^c$ (wherein $R^a$ to $R^c$ are as defined above) for $T^2$ is used as an acetal ester protecting group, and can undergo deprotection under hydrolytic conditions. With respect to the structure of each of $R^a$ to $R^c$, there is no particular limitation as long as it is a chemical species that enables protecting and deprotection for a carboxyl group. In view of easy availability of a reagent for forming a protecting group, a preferred mode is the group wherein $R^a$ is a methyl group, or $R^b$ and $R^c$ together form a divalent hydrocarbon group having 1 to 8 carbon atoms and optionally having at least one methylene group replaced by an ether group or an ester group.

As examples of compounds known as a reagent for forming group $-CR^aR^b-O-R^c$ for $T^2$, namely, for introducing a protecting group for a carboxyl group, there can be mentioned 3,4-dihydro-2H-pyran, 2,3-dihydrofuran, allyl alkyl ethers, such as allyl ethyl ether and allyl isobutyl ether, and chloromethyl methyl ether.

X is a direct bond or a group represented by: $-COO-R'-$ (wherein R' is a divalent hydrocarbon group having 1 to 30 carbon atoms). In group $-COO-R'-$, R' is a divalent hydrocarbon group, and examples include alkylene groups, such as a methylene group ($-CH_2-$), an ethylene group ($-CH_2CH_2-$), a propylene group ($-CH_2CH_2CH_2-$), and a butylene group ($-CH_2CH_2CH_2CH_2-$), and arylene groups, such as a 1,4-phenylene group ($-C_6H_4-$). R' is preferably a linear alkylene group. X is preferably a direct bond.

As unlimited examples of the preferred monomer from which structural units (b-2) are derived, there can be mentioned t-butyl acrylate, allyl acrylate, benzyl acrylate, and the compounds shown below. Based on these examples and the above-mentioned definition, those skilled in the art can determine a structure of the monomer from which structural units (b-2) are derived, irrespective of the examples shown below.

[Chemical formula 2]

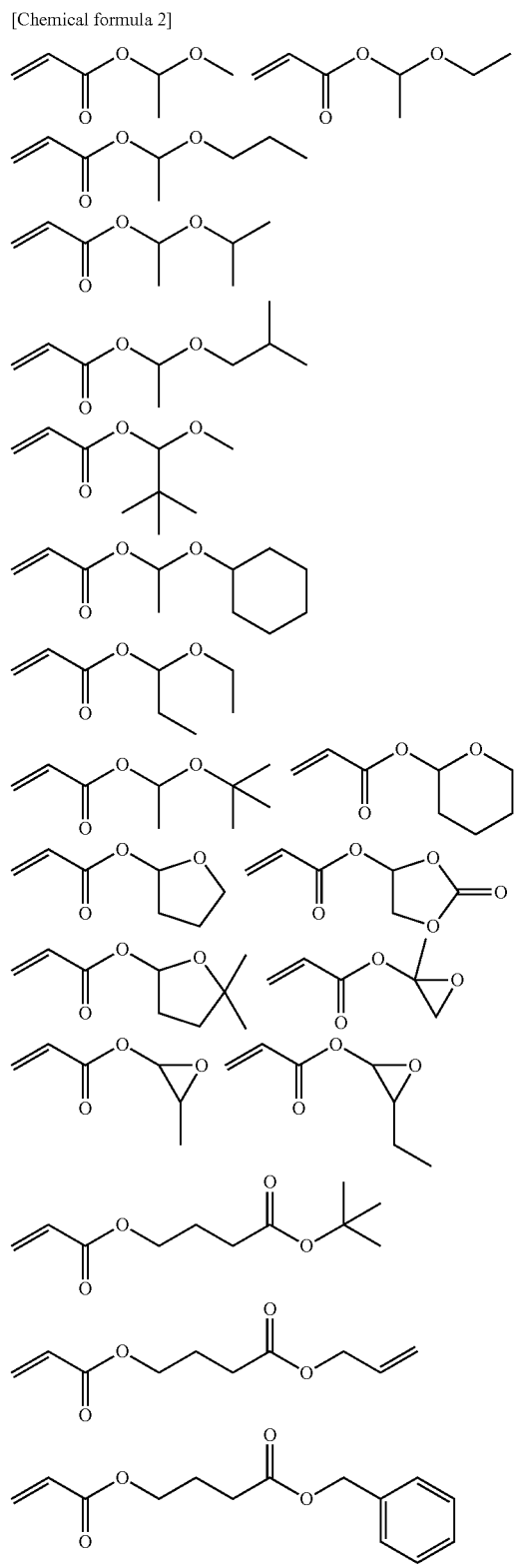

(3) Structural Units (C)

Structural units (C) are structural units derived from an acrylic acid derivative, which do not have a carboxyl group, and which do not cause an elimination reaction due to heat or an acid under the same conditions as those for the elimination reaction due to heat or an acid in which structural units (B) form a carboxyl group. Therefore, the monomer from which structural units (C) are derived is acrylic acid ester (H$_2$C=CHC(=O)OR), but, differing from the above-mentioned structural units (B), R in the above formula does not have a carboxyl group as a substituent and does not cause an elimination reaction. With respect to the chemical species of the monomer from which structural units (C) are derived, there is no particular limitation as long as the above requirements are satisfied, and those skilled in the art can appropriately select the monomer, considering, for example, the reactivity of the monomer, and physical properties to be imparted to the copolymer. In the present specification, the wording that structural units (C) "do not cause an elimination reaction" means that structural units (C) do not cause an elimination reaction under the same conditions as those for the elimination reaction due to heat or an acid in which structural units (B) form a carboxyl group.

A preferred monomer from which structural units (C) are derived is a polar group-containing olefin monomer represented by the following general formula (3):

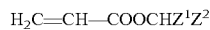
(3)

wherein, in the general formula (3), each of $Z^1$ and $Z^2$ is independently a substituent selected from the group consisting of:
a hydrogen atom,
a hydroxyl group,
a hydrocarbon group having 1 to 10 carbon atoms and being substituted with a hydroxyl group,
an alkyl group having 1 to 30 carbon atoms,
a hydrocarbon group having 3 to 20 carbon atoms and being substituted with an alkoxycarbonyl group having 2 to 10 carbon atoms,
a hydrocarbon group having 3 to 20 carbon atoms and being substituted with an acyloxy group having 2 to 10 carbon atoms,
a hydrocarbon group having 2 to 20 carbon atoms and being substituted with a substituted amino group having 1 to 12 carbon atoms,
a hydrocarbon group having 4 to 30 carbon atoms and being substituted with a substituted silyl group having 3 to 18 carbon atoms,
an alkoxycarbonyl group having 2 to 20 carbon atoms,
an acyloxy group having 2 to 10 carbon atoms,
an amino group,
a substituted amino group having 1 to 12 carbon atoms,
a substituted silyl group having 3 to 18 carbon atoms, and
a hydrocarbon group having 1 to 20 carbon atoms and being substituted with a halogen,
wherein $Z^1$ and $Z^2$ are optionally bonded together to form a ring.

In the general formula (3), with respect to the preferred number of carbon atoms of the alkyl group, alkoxycarbonyl group, acyloxy group, substituted amino group, substituted silyl group, and hydrocarbon group, and others, those mentioned above in connection with the general formula (1) can be employed.

In the general formula (3), it is preferred that when one of $Z^1$ and $Z^2$ is a hydroxyl group or an amino group, another one is a hydrogen atom. Therefore, the substituent bonded to an oxygen atom derived from acrylic acid is preferably a methyl group, a hydroxymethyl group, (a) an (substituted) aminomethyl group, a substituted silylmethyl group, or one having at least two carbon atoms continuously arranged.

With respect to the preferred monomer from which structural units (C) are derived, unlimited examples are shown below. These are merely examples, and, with respect to the type of the monomer from which structural units (C) are derived, there is no limitation as long as the above-mentioned requirements are satisfied, and, based on these examples and the above-mentioned definition, those skilled in the art can determine a structure of the monomer, irrespective of the examples shown below.

[Chemical formula 3-1]

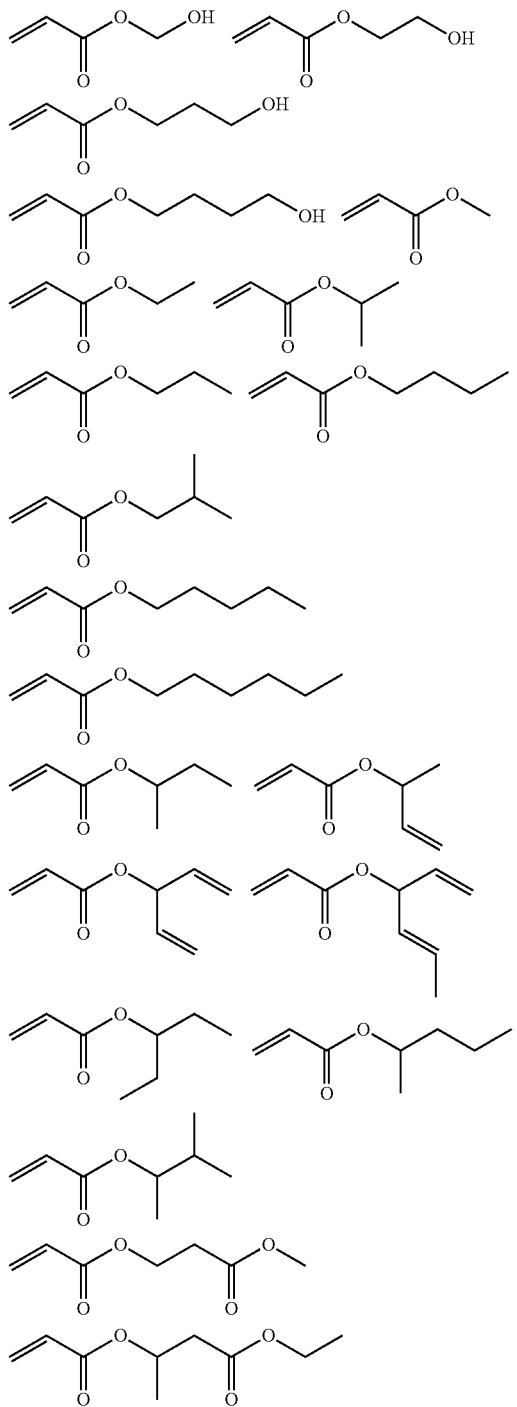

-continued
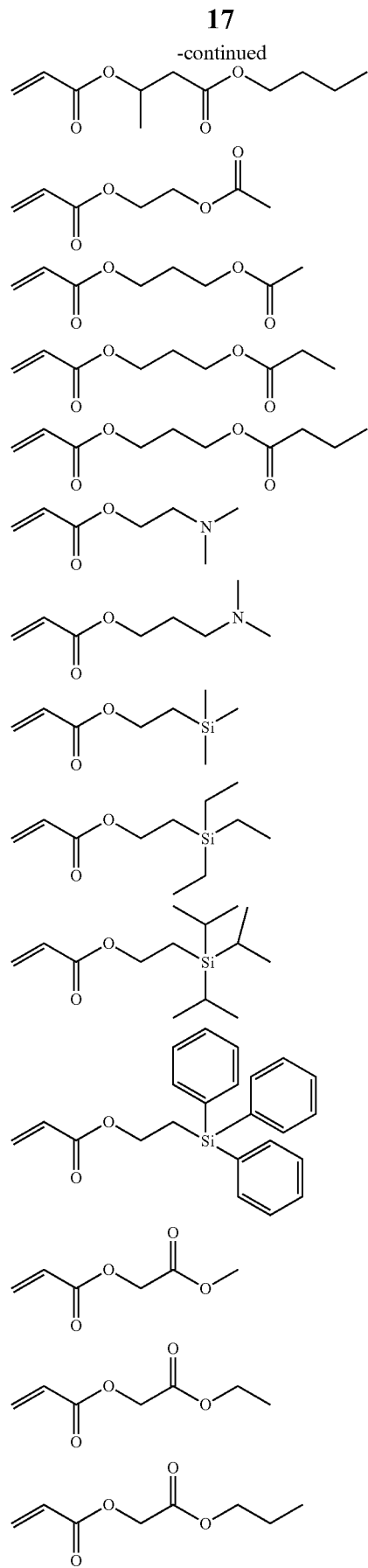
-continued
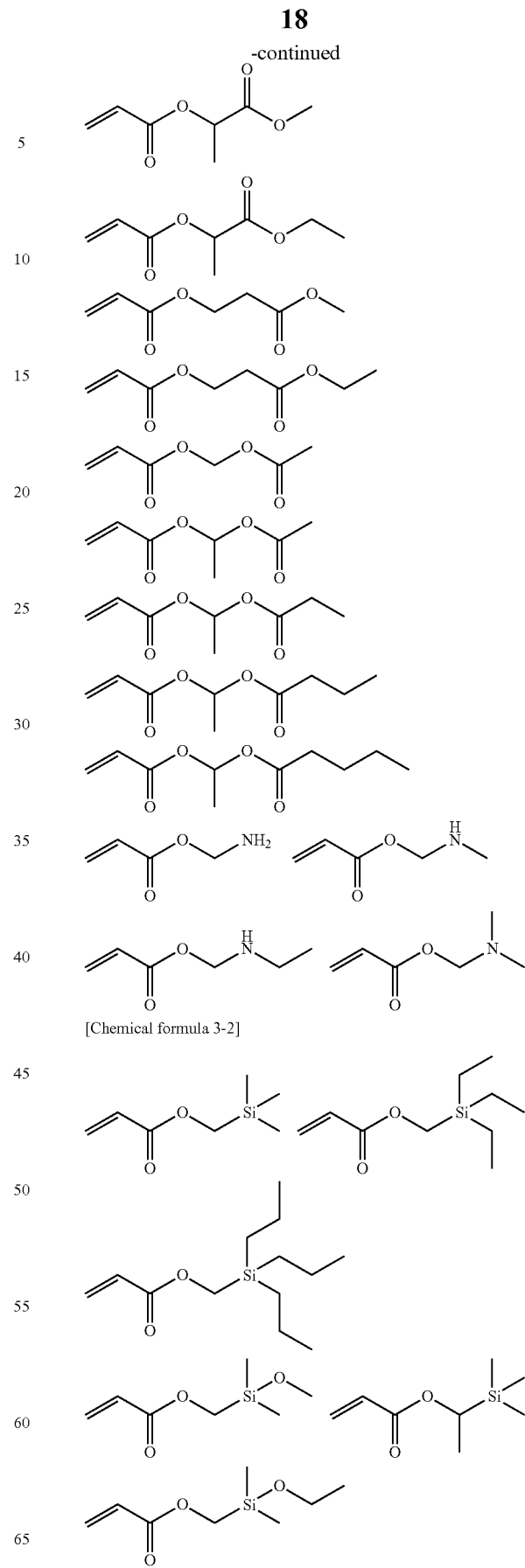
[Chemical formula 3-2]

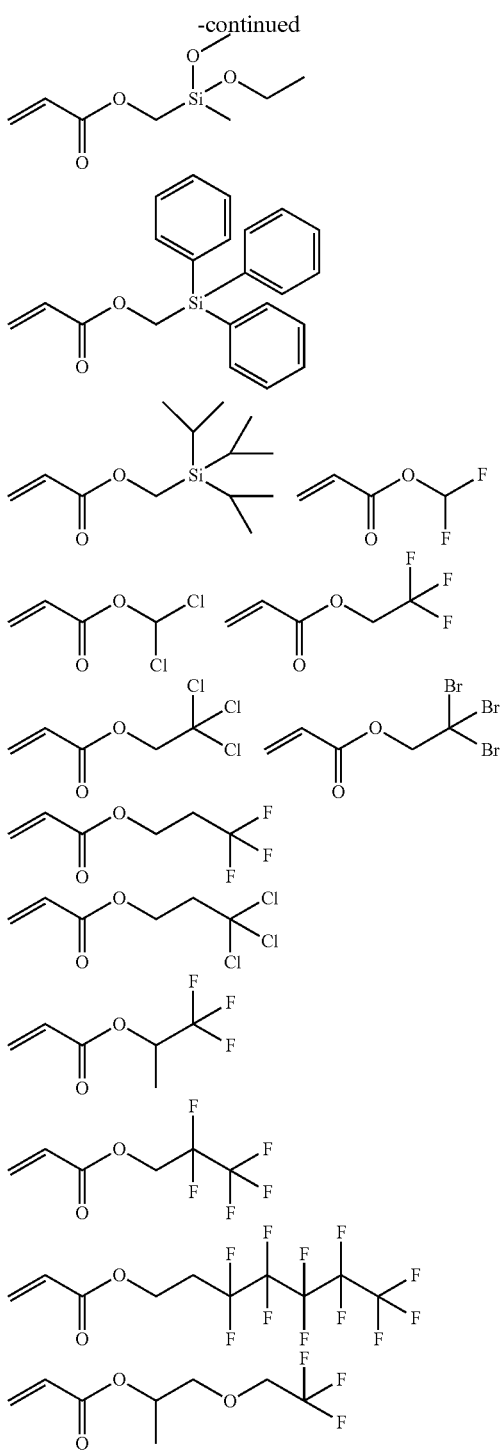

(4) Polar Group-Containing Multi-Component Olefin Copolymer

The polar group-containing multi-component olefin copolymer of the present disclosure, as mentioned above, comprises: structural units (A) derived from ethylene or an α-olefin; structural units (B) having a carboxyl group or a structure which forms a carboxyl group by an elimination reaction due to heat or an acid; and structural units (C) derived from acrylic acid, which do not have a carboxyl group, and which do not cause an elimination reaction due to heat or an acid under the same conditions as those for the elimination reaction due to heat or an acid in which the structural units (B) form a carboxyl group.

The polar group-containing multi-component olefin copolymer of the present disclosure contains at least one type of each of the above-mentioned structural units (A), (B), and (C), and comprises three or more in total types of monomer units.

The structural units of the polar group-containing multi-component olefin copolymer of the present disclosure and the structural unit amount are described below.

With respect to each of the ethylene or α-olefin, the monomer having a carboxyl group or a structure which forms a carboxyl group by an elimination reaction due to heat or an acid, and the acrylic acid monomer which does not have a carboxyl group, and which does not cause an elimination reaction due to heat, the structure derived from one molecule is defined as one structural unit in the polar group-containing multi-component olefin copolymer.

The ratio of the structural units for each monomer to the polar group-containing multi-component olefin copolymer is a structural unit amount indicated by mol %.

Structural Unit Amount for Ethylene or α-Olefin (A):

With respect to the structural unit amount for structural units (A) in the present disclosure, the lower limit is 60.000 mol % or more, preferably 70.000 mol % or more, more preferably 80.000 mol % or more, further preferably 85.000 mol % or more, further more preferably 87.000 mol % or more, especially preferably 91.400 mol % or more, and the upper limit is selected from 97.999 mol % or less, preferably 97.990 mol % or less, more preferably 97.980 mol % or less, further preferably 96.980 mol % or less, further more preferably 96.900 mol % or less, especially preferably 94.300 mol %.

When the structural unit amount derived from ethylene and/or an α-olefin having 3 to 20 carbon atoms is smaller than the above range, the toughness is likely to become poor, and, when the structural unit content is larger than the above range, it is likely that the crystallinity is increased and the transparency becomes poor.

Structural Unit Amount for Monomer (B) Having a Carboxyl Group or a Structure which Forms a Carboxyl Group by an Elimination Reaction Due to Heat or an Acid:

With respect to the structural unit amount for structural units (B) in the present disclosure, the lower limit is 2.000 mol % or more, preferably 2.900 mol % or more, and the upper limit is 20.000 mol % or less, preferably 15.000 mol % or less, more preferably 10.000 mol % or less, further preferably 8.000 mol %, especially preferably 6.100 mol % or less. When the structural unit amount derived from the olefin monomer is smaller than the above range, it is likely that satisfactory adhesion to a highly polar different material cannot be achieved, and, when the structural unit content is larger than the above range, it is likely that satisfactory mechanical physical properties cannot be obtained.

Structural unit amount for monomer (C) derived from acrylic acid, which does not have a carboxyl group, and which does not cause an elimination reaction due to heat or an acid under the same conditions as those for the elimination reaction due to heat or an acid in which structural units (B) form a carboxyl group:

With respect to the structural unit amount for structural units (C) in the present disclosure, the lower limit is 0.001 mol % or more, preferably 0.010 mol % or more, more preferably 0.100 mol % or more, further preferably 0.500 mol % or more, most preferably 1.900 mol % or more, and the upper limit is 20.000 mol % or less, preferably 15.000 mol % or less, more preferably 10.000 mol % or less, further preferably 7.000 mol % or less, especially preferably 4.800 mol % or less. When the structural unit amount derived from the olefin is smaller than the above range, the rigidity is likely to become unsatisfactory, and, when the structural unit content is larger than the above range, it is likely that an excellent balance between the rigidity and the toughness cannot be obtained.

The total of the amount of structural units (A), structural units (B), and structural units (C) must be 100 mol %, but it is preferred that the amount of structural units (A) is set so that the amount of structural units (B) and (C) are in the above-mentioned respective ranges.

Method for Measuring a Structural Unit Amount for a Polar Group-Containing Monomer of the Polar Group-Containing Multi-Component Olefin Copolymer:

A structural unit amount of a polar group in the polar group-containing multi-component olefin copolymer of the present disclosure can be determined using a $^{13}$C-NMR spectrum. A $^{13}$C-NMR spectrum is measured by, for example, the following method.

200 to 250 mg of a sample is placed in an NMR sample tube having an inner diameter of 10 mmϕ, together with 2.4 ml of o-dichlorobenzene/deuterated bromobenzene $(C_6D_5Br)=4/1$ (volume ratio) and hexamethyldisiloxane as a chemical shift standard substance, and the tube is purged with nitrogen gas and then sealed, and the sample is dissolved by heating to obtain a uniform solution, and the solution is subjected to NMR measurement.

The NMR measurement is conducted at 120° C. using NMR apparatus Model AV400M, manufactured by Bruker BioSpin corp., having 10 mmϕ Cryoprobe attached.

The $^{13}$C-NMR measurement is performed by an inverse gated decoupling method under conditions such that the pulse angle is 90°, the pulse interval is 51.5 seconds, and the accumulation number is 512 or more. With respect to the chemical shift, a peak of the methyl carbon of hexamethyldisiloxane is set to 1.98 ppm, and, using this peak as a reference, chemical shifts of peaks ascribed to other carbons are determined.

In the obtained $^{13}$C-NMR spectrum, a signal characteristic of the substituent of a copolymer is identified, and the strengths of signals are compared, enabling an analysis of a content of each comonomer in the copolymer. Substituents and the positions of signals thereof can be found with reference to known materials, and can be identified independently according to individual samples. Those skilled in the art can generally conduct such an analysis method.

Weight Average Molecular Weight (Mw) and Molecular Weight Distribution (Mw/Mn):

The polar group-containing multi-component olefin copolymer of the present disclosure generally has a weight average molecular weight (Mw) in the range of from 1,000 to 2,000,000, preferably 10,000 to 1,500,000, further preferably 20,000 to 1,000,000, advantageously 31,000 to 800,000, more advantageously 35,000 to 800,000. When the Mw is less than 1,000, the copolymer is likely to be unsatisfactory in physical properties, such as a mechanical strength and an impact resistance, and, when the Mw is more than 2,000,000, it is likely that the copolymer has such a high melt viscosity that molding processing for the copolymer is difficult.

In the polar group-containing multi-component olefin copolymer of the present disclosure, the ratio of the weight average molecular weight (Mw) to the number average molecular weight (Mn) (Mw/Mn) is preferably in the range of from 1.5 to 4.0, more preferably 1.6 to 3.3, further preferably 1.7 to 3.0. When the Mw/Mn is less than 1.5, the copolymer is likely to be unsatisfactory in various types of processability including moldability, and, when the Mw/Mn is more than 4.0, the copolymer is likely to have poor mechanical physical properties. In the present disclosure, the (Mw/Mn) is frequently expressed as a molecular weight distribution parameter.

The weight average molecular weight (Mw) in the present disclosure is determined by gel permeation chromatography (GPC). The molecular weight distribution parameter (Mw/Mn) is obtained by further determining a number average molecular weight (Mn) by gel permeation chromatography (GPC), and calculating the ratio of Mw to Mn, i.e., Mw/Mn.

An example of the measurement method for GPC in the present disclosure is described in the Examples below, and measurement can be made using a commercially available apparatus and the measurement conditions therefor. The determination of a molecular weight is conducted by a standard polystyrene method, and conversion to a molecular weight from the retention volume can be made using a calibration curve preliminarily obtained from standard polystyrenes. The standard polystyrenes used are, for example, of the following grades (F380, F288, F128, F80, F40, F20, F10, F4, F1, A5000, A2500, A1000), all of which are manufactured by Tosoh Corp. 0.2 mL of a solution obtained by dissolving each sample in ODCB (containing BHT in an amount of 0.5 mg/mL) at 0.5 mg/mL is injected to prepare a calibration curve. As the calibration curve, a cubic expression obtained by approximation by a method of least squares is used. In the viscosity formula $[\eta]=K \times M\alpha$, which is used in the conversion to a molecular weight, the following values are used.

PS: $K=1.38 \times 10^{-4}$, $\alpha=0.7$
PE: $K=3.92 \times 10^{-4}$, $\alpha=0.733$
PP: $K=1.03 \times 10^{-4}$, $\alpha=0.78$ Melting Point (° C.):

In the polar group-containing multi-component olefin copolymer of the present disclosure, it is more preferred that the melting point (Tm, ° C.) as measured by differential scanning calorimetry (DSC) and the total content [Y] (mol %) of structural units (B) and structural units (C) satisfy the following formula (I).

$$50<Tm<-3.74\times[Y]+130 \tag{I}$$

The factors that affect the mechanical physical properties of the copolymer include the total content [Y] (mol %) of structural units (B) and structural units (C) of the copolymer, and further the melting point of the copolymer largely affects the physical properties, and the copolymer having a lower melting point can exhibit higher mechanical physical properties.

However, for example, in the case of a binary copolymer having ethylene as component (A) and component (B), the melting point of the copolymer depends on the content of component (B) in the copolymer, and the copolymer having a melting point which is lower than $-3.74\times[Y]+130$ (° C.) (wherein [Y] is a content (mol %) of structural units (B)) is extremely difficult to obtain, so that it is likely that a satisfactory improvement of the mechanical physical properties cannot be expected.

Therefore, when the copolymer of the present disclosure has a melting point which is more than $-3.74\times[Y]+130$ (° C.), it is likely that an improvement of the mechanical physical properties cannot be expected, making it difficult to achieve satisfactory mechanical physical properties. On the other hand, when the copolymer has a melting point of lower than 50° C., it is likely that the ethylene copolymer cannot retain the required heat resistance.

A melting point can be determined, for example, using "EXSTAR6000", manufactured by Seiko Instruments Inc., by measurement conducted by maintaining the temperature at 40° C. for one minute, increasing the temperature from 40° C. to 160° C. at 10° C./minute, maintaining the temperature at 160° C. for 10 minutes, decreasing the temperature from 160° C. to 10° C. at 10° C./minute, maintaining the temperature at 10° C. for 5 minutes, and then increasing the temperature from 10° C. to 160° C. at 10° C./minute.

The melting point Tm of the polar group-containing multi-component olefin copolymer of the present disclosure more preferably satisfies the relationship of the formula (I) above, but, when the copolymer is polyethylene, the melting point is further preferably more than 50 to less than 130° C., especially preferably 60 to 128° C., most preferably 70 to 126° C. When the melting point of the copolymer is lower than the above range, the heat resistance is likely to be unsatisfactory, and, when the melting point is higher than the above range, the impact resistance is likely to be poor.

Crystallinity (%):

In the polar group-containing multi-component olefin copolymer of the present disclosure, with respect to the crystallinity as measured by differential scanning calorimetry (DSC), there is no particular limitation, but the crystallinity of the copolymer is preferably more than 0 to 30%, further preferably more than 0 to 25%, most preferably more than 5 to 25%.

When the crystallinity of the copolymer is lower than the above range, the toughness is unsatisfactory, and, when the crystallinity is higher than the above range, the transparency is poor. The crystallinity can be used as an index of transparency, and the lower the crystallinity, the more excellent the transparency.

A crystallinity can be determined, for example, using "EXSTAR6000", manufactured by Seiko Instruments Inc., by determining a heat of fusion from the fusion endothermic peak area obtained when increasing the temperature from room temperature to 160° C., and dividing the determined heat of fusion by the heat of fusion (293 J/g) of polyethylene (HDPE) perfect crystal.

Molecular Structure of the Polar Group-Containing Multi-Component Olefin Copolymer:

With respect to the polar group-containing multi-component olefin copolymer of the present disclosure, examples of copolymers include a random copolymer, a block copolymer, and a graft copolymer of structural units (A), (B), and (C). Of these, the copolymer may be a random copolymer which can have a large polar group content.

The molecular chain end of the polar group-containing multi-component olefin copolymer of the present disclosure may be any of structural units (A), (B), and (C).

The polar group-containing multi-component olefin copolymer of the present disclosure may be produced in the presence of a transition metal catalyst from the viewpoint of obtaining the copolymer having a molecular structure of a linear chain.

It is known that the molecular structure of a copolymer varies depending on the method for producing the copolymer, for example, polymerization conducted by a high-pressure radical polymerization process, or polymerization using a metal catalyst.

The molecular structure of a copolymer can be controlled by selecting the method for producing the copolymer. For example, as described in Japanese Unexamined Patent Publication No. 2010-150532, the molecular structure can be presumed from a complex modulus measured by a rotational rheometer.

Phase Angle $\delta$ at a Complex Modulus Absolute Value $G^*$ of 0.1 MPa

In the polar group-containing multi-component olefin copolymer of the present disclosure, the phase angle $\delta$ at a complex modulus absolute value $G^*$ of 0.1 MPa, as measured by a rotational rheometer, may be 50 to 75 degrees.

More specifically, when the phase angle $\delta$ ($G^*$=0.1 MPa) at a complex modulus absolute value $G^*$ of 0.1 MPa, as measured by a rotational rheometer, is 50 degrees or more, such a value of the phase angle shows that the molecular structure is a linear chain structure which contains no long-chain branch, or which contains long-chain branches in such a small amount that causes no effect on the mechanical strength.

When the phase angle $\delta$ ($G^*$=0.1 MPa) at a complex modulus absolute value $G^*$ of 0.1 MPa, as measured by a rotational rheometer, is less than 50 degrees, such a value of the phase angle shows that the molecular structure is a structure containing long-chain branches in too large an amount, and the mechanical strength tends to be poor.

The phase angle $\delta$ at a complex modulus absolute value $G^*$ of 0.1 MPa, as measured by a rotational rheometer, is affected by both the molecular weight distribution and the long-chain branch, but, with respect to the copolymer which satisfies: Mw/Mn≤4, more preferably Mw/Mn≤3, the phase angle can be used as an index of the amount of long-chain branches, and the larger the amount of long-chain branches, the smaller the $\delta$ ($G^*$=0.1 MPa) value. With respect to the copolymer in which Mw/Mn is 1.5 or more, even when the copolymer contains no long-chain branch, the $\delta$ ($G^*$=0.1 MPa) value does not exceed 75 degrees.

The method for measuring a complex modulus is as follows.

A specimen is placed in a mold for hot pressing having a thickness of 1.0 mm, and preheated in a hot pressing machine having a surface temperature of 180° C. for 5 minutes, and then a cycle of application of the pressure and reduction of the pressure is repeated for deaeration of the gas remaining in the molten resin, and further a pressure of 4.9 MPa is applied to the resin and maintained for 5 minutes. Then, the resultant resin is transferred to a pressing machine having a surface temperature of 25° C., and cooled by maintaining it at a pressure of 4.9 MPa for 3 minutes, preparing a pressed plate formed from a specimen having a thickness of about 1.0 mm. The pressed plate formed from the specimen is processed into a circular form having a diameter of 25 mm and used as a sample, and, using rotational rheometer Model ARES, manufactured by Rheometrics, Inc., as a measurement apparatus for dynamic viscoelastic properties, dynamic viscoelastic properties are measured in a nitrogen gas atmosphere under the following conditions.

Plate: φ25 mm Parallel plate
Temperature: 160° C.
Strain amount: 10%
Measuring range of circular frequency: $1.0 \times 10^{-2}$ to $1.0 \times 10^2$ rad/s
Measurement interval: 5 points/decade A phase angle $\delta$ is plotted for the common logarithm log $G^*$ of a complex modulus absolute value $G^*$ (Pa), and a $\delta$ (degree) value of the point corresponding to log $G^*$=5.0 is taken as $\delta$ ($G^*$=0.1 MPa).

When the point corresponding to log $G^*$=5.0 is not present in the measured points, a $\delta$ value of the point for log $G^*$=5.0 is determined by linear interpolation using two points around log $G^*$=5.0. Further, when all the measured points correspond to log $G^*$<5, a $\delta$ value of the point for log G*=5.0 is determined by extrapolation using a quadratic curve using three points of the larger log G* values.

Molecular Structure of the Polar Group-Containing Multi-Component Olefin Copolymer:

The polar group-containing multi-component olefin copolymer of the present disclosure may be a random copolymer.

Molecular structure example (1) of a general polar group-containing ternary olefin copolymer is shown below.

The random copolymer is a copolymer such that, in the below-shown molecular structure example (1), with respect to structural units (A) of ethylene or an α-olefin having 3 to 20 carbon atoms, structural units (B) of a polar group-containing monomer, and structural units (C) of a nonpolar cyclic olefin, the probability of finding each structural unit in an arbitrary position of the molecular chain is irrelevant to the type of the adjacent structural unit.

Further, the molecular chain end of the polar group-containing olefin copolymer may be structural unit (A) of ethylene or an α-olefin having 3 to 20 carbon atoms, may be structural unit (B) of a polar group-containing monomer, and may be structural unit (C) of a nonpolar cyclic olefin.

As shown below, in the molecular structure example (1) of the polar group-containing olefin copolymer, structural units (A) of ethylene and/or an α-olefin having 3 to 20 carbon atoms, structural units (B) of a polar group-containing monomer, and structural units (C) of a nonpolar cyclic olefin form a random copolymer.

[Chemical formula 4]

-ABCAAABBCBAABACCAA-    Molecular structure example (1)

The molecular structure example (2) of an olefin copolymer having a polar group introduced by graft modification is also shown below for reference. Part of the olefin copolymer formed by copolymerization of structural units (A) of ethylene and/or an α-olefin having 3 to 20 carbon atoms and structural units (C) of a nonpolar cyclic olefin is graft-modified with structural units (B) of a polar group-containing monomer.

[Chemical formula 5]

Molecular structure example (2)

Methyl Branch

In the polymer obtained by a polymerization reaction, generally, as shown above, monomers are connected in a linear form to form a molecular chain which constitutes the principal chain. In the present invention, generally, the olefin portions (C=C) of structural units (A), (B), and (C) are connected in a linear form to form a polyethylene chain. In this case, for example, the saturated hydrocarbon chain in structural units (A) which contain an α-olefin, group T' or the portion represented by —$X^1$—$COOT^2$ in structural units (B), and the portion represented by —$COOCHZ^1Z^2$ in structural units (C) are present as a side chain of the polyethylene chain. However, a phenomenon occurs such that part of the olefin portions do not form a molecular chain in a linear form but form branches. In such a case, a structure in which a methyl group is present as a side chain is formed, and this is expressed as methyl branch. Generally, it is known that the number of branches of a polyethylene chain and the melting point have the relationship of negative proportionality, and, when the number of branches is increased, the melting point is reduced, and that this relationship does not depend on the type of the branched group (if necessary, see Skupov, K. M.; Piche, L.; Claverie, J. P. Macromolecules 2008, 41, p. 2309-2310). That is, when the amount of structural units (B) and (C) or methyl branches contained in the copolymer is increased, there is a tendency that the melting point of the copolymer is lowered, and the heat resistance and strength of the copolymer become poor. When the contents of structural units (B) and (C) are consistent, it is considered that functional properties due to the polar group are exhibited at the same level, and that the copolymer having reduced methyl branches has an increased melting point and exhibits an improved heat resistance and strength. The copolymer produced by a radical polymerization method has a structure having a large amount of long-chain branches and short-chain branches irregularly arranged, and hence has a disadvantage in that the strength is unsatisfactory. In the present invention, the number of methyl branches is preferably 50 or less per 1,000 carbon atoms, more preferably 5 or less per 1,000 carbon atoms, further preferably 3.0 or less, especially preferably 1.0 or less, and the lower limit of the number of methyl branches is not particularly limited, and is preferably as small as possible. The number of methyl branches is preferably small because the heat resistance and strength are further improved. The method for measuring the number of methyl branches in a polymer is as described later, and the method that those skilled in the art can generally conduct can be used.

(5) With Respect to the Production of the Polar Group-Containing Multi-Component Olefin Copolymer The polar group-containing multi-component olefin copolymer of the present disclosure may be produced in the presence of a transition metal catalyst from the viewpoint of obtaining the copolymer having a molecular structure of a linear chain.

Polymerization Catalyst

With respect to the type of the polymerization catalyst used in producing the polar group-containing multi-component olefin copolymer of the present disclosure, there is no particular limitation as long as the catalyst can cause the monomers from which structural units (A), (B), and (C) are derived to undergo copolymerization, but, for example, there can be mentioned transition metal compounds belonging to Groups 5 to 11 and having a chelate ligand.

Specific preferred examples of transition metals include a vanadium atom, a niobium atom, a tantalum atom, a chromium atom, a molybdenum atom, a tungsten atom, a manganese atom, an iron atom, a platinum atom, a ruthenium atom, a cobalt atom, a rhodium atom, a nickel atom, a palladium atom, and a copper atom. Of these, preferred are transition metals belonging to Groups 8 to 11, further preferred are transition metals belonging to Group 10, and especially preferred are nickel (Ni) and palladium (Pd). These metals may be used individually or in combination.

The chelate ligand contains a bidentate or multidentate ligand having at least two atoms selected from the group consisting of P, N, O, and S, and is electronically neutral or anionic. Examples of the structures of chelate ligands are shown in the review by Brookhart et. al. (Chem. Rev., 2000, 100, 1169).

Preferred examples of bidentate anionic P, O ligands include phosphorus-sulfonic acid, phosphorus-carboxylic acid, phosphorus-phenol, and phosphorus-enolate, and examples of bidentate anionic N, O ligands include salicylaldiminate and pyridinecarboxylic acid, and further examples include a diimine ligand, a diphenoxide ligand, and a diamide ligand.

The structure of the metal complex obtained from a chelate ligand is represented by the structural formula (A) and/or (B) below, which has coordinated thereto an arylphosphine compound, arylarsine compound, or arylantimony compound optionally having a substituent.

[Chemical formula 6]

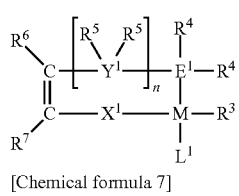

Structural formula (A)

[Chemical formula 7]

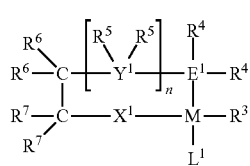

Structural formula (B)

[In structural formulae (A) and (B), M represents a transition metal belonging to any one of Groups 5 to 11 of the Periodic Table of elements, i.e., the above-mentioned various transition metals.

$X^1$ represents oxygen, sulfur, —$SO_3$—, or —$CO_2$—.

$Y^1$ represents carbon or silicon.

n represents an integer of 0 or 1.

$E^1$ represents phosphorus, arsenic, or antimony.

$R^1$ represents hydrogen or a hydrocarbon group having 1 to 20 carbon atoms.

$R^2$ represents a hydrocarbon group having 1 to 20 carbon atoms.

Each of $R^3$ and $R^4$ independently represents hydrogen or a hydrocarbon group having 1 to 30 carbon atoms and optionally containing a heteroatom.

$R^5$ each independently represents hydrogen, a halogen, or a hydrocarbon group having 1 to 30 carbon atoms and optionally containing a heteroatom.

Each of $R^6$ and $R^7$ independently represents hydrogen, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $SOR^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group.

M' represents an alkali metal, an alkaline earth metal, an ammonium, or a quaternary ammonium or phosphonium, x represents an integer of 0 to 3, and y represents an integer of 0 to 2.

$R^6$ and $R^7$ are optionally bonded together to form an alicyclic ring, an aromatic ring, or a heterocycle containing a heteroatom selected from oxygen, nitrogen, and sulfur. In this case, the ring is a 5- to 8-membered ring, and optionally has a substituent on the ring.

$L^1$ represents a ligand which has coordinated to M.

$R^3$ and $L^1$ are optionally bonded together to form a ring.]

The wording "optionally containing a heteroatom" means that the presence of a structure having carbon of a hydrocarbon or a methylene group (—$CH_2$—) replaced by a heteroatom, such as oxygen, nitrogen, or sulfur, or having a hydrogen atom of a hydrocarbon replaced by a heteroatom, for example, the presence of an ether structure or a carbonyl group is acceptable.

The catalyst used in producing the copolymer of the present invention is more preferably a transition metal complex represented by the following structural formula (C).

[Chemical formula 8]

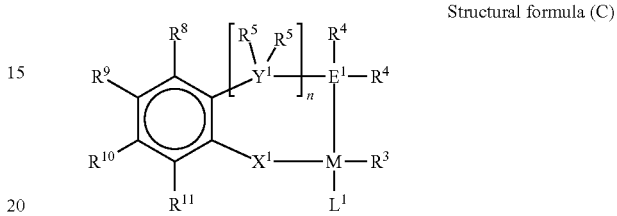

Structural formula (C)

[In structural formula (C), M represents a transition metal belonging to any one of Groups 5 to 11 of the Periodic Table of elements, i.e., the above-mentioned various transition metals.

$X^1$ represents oxygen, sulfur, —$SO_3$—, or —$CO_2$—.

$Y^1$ represents carbon or silicon.

n represents an integer of 0 or 1.

$E^1$ represents phosphorus, arsenic, or antimony.

Each of $R^3$ and $R^4$ independently represents hydrogen or a hydrocarbon group having 1 to 30 carbon atoms and optionally containing a heteroatom.

$R^5$ each independently represents hydrogen, a halogen, or a hydrocarbon group having 1 to 30 carbon atoms and optionally containing a heteroatom.

Each of $R^8$, $R^9$, $R^{10}$, and $R^{11}$ independently represents hydrogen, a halogen, a hydrocarbon group having 1 to 30 carbon atoms and optionally containing a heteroatom, $OR^2$, $CO_2R^2$, $CO_2M'$, $C(O)N(R^1)_2$, $C(O)R^2$, $SR^2$, $SO_2R^2$, $SOR^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$, or an epoxy-containing group.

M' represents an alkali metal, an alkaline earth metal, an ammonium, or a quaternary ammonium or phosphonium, x represents an integer of 0 to 3, and y represents an integer of 0 to 2.

Two or more groups appropriately selected from $R^8$ to $R^{11}$ are optionally bonded together to form an alicyclic ring, an aromatic ring, or a heterocycle containing a heteroatom selected from oxygen, nitrogen, and sulfur. In this case, the ring is a 5- to 8-membered ring, and optionally has a substituent on the ring.

$L^1$ represents a ligand which has coordinated to M.

$R^3$ and $L^1$ are optionally bonded together to form a ring.]

As representative examples of catalysts of transition metal compounds belonging to Groups 5 to 11 having a chelate ligand, catalysts called a SHOP catalyst and a Drent catalyst have been known.

A SHOP catalyst is a catalyst in which a phosphorus ligand having an aryl group optionally having a substituent has coordinated to a nickel metal (see, for example, WO2010-050256).

A Drent catalyst is a catalyst in which a phosphorus ligand having an aryl group optionally having a substituent has coordinated to a palladium metal (see, for example, Japanese Unexamined Patent Publication No. 2010-202647).

Organometallic Compound:

In the production of the polar group-containing multi-component olefin copolymer of the present disclosure, when a polar group-containing olefin monomer and an organometallic compound in a small amount are caused to be in contact with each other and then monomers from which structural units (A), (B), and (C) are derived are subjected to copolymerization in the presence of the above-mentioned transition metal catalyst, the polymerization activity can be further improved.

The organometallic compound is an organometallic compound containing a hydrocarbon group optionally having a substituent, and can be represented by the following structural formula (H):

$$R^{30}{}_nM^{30}X^{30}{}_{m-n} \qquad \text{Structural formula (H)}$$

wherein $R^{30}$ represents a hydrocarbon group having 1 to 12 carbon atoms and optionally having a substituent, $M^{30}$ represents a metal selected from the group consisting of metals belonging to Groups 1, 2, 12, and 13 of the Periodic Table, $X^{30}$ represents a halogen atom or a hydrogen atom, m is a valence of $M^{30}$, and n is 1 to m.

Examples of organometallic compounds represented by the structural formula (H) above include alkylaluminums, such as tri-n-butylaluminum, tri-n-hexylaluminum, tri-n-octylaluminum, and tri-n-decylaluminum, and alkylaluminum halides, such as methylaluminum dichloride, ethylaluminum dichloride, dimethylaluminum chloride, diethylaluminum chloride, and diethylaluminum ethoxide, and a trialkylaluminum is preferably selected.

More preferred is a trialkylaluminum having a hydrocarbon group having 4 or more carbon atoms, and further preferred is a trialkylaluminum having a hydrocarbon group having 6 or more carbon atoms, and tri-n-hexylaluminum, tri-n-octylaluminum, or tri-n-decylaluminum is more preferably selected, and tri-n-octylaluminum can be most preferably used.

From the viewpoint of the polymerization activity and cost, it is preferred that the amount of the organometallic compound to be in contact with the polar group-containing olefin comonomer is an amount such that the molar ratio of the organometallic compound to the polar group-containing olefin comonomer is $10^{-5}$ to 0.9, preferably $10^{-4}$ to 0.2, further preferably $10^{-4}$ to 0.1.

Polymerization Method for the Polar Group-Containing Multi-Component Olefin Copolymer:

With respect to the polymerization method for the polar group-containing multi-component olefin copolymer of the present disclosure, there is no limitation.

An example of the polymerization method is described in detail in the Examples below, but, for example, there is used slurry polymerization in which at least part of the formed polymer is in the form of a slurry in a medium, bulk polymerization in which a liquified monomer itself is used as a medium, gas phase polymerization in which polymerization is conducted in a vaporized monomer, or high-pressure ionic polymerization in which at least part of the formed polymer is dissolved in a monomer liquified at a high temperature and a high pressure.

The manner of polymerization may be any of manners of batch polymerization, semi-batch polymerization, and continuous polymerization.

Alternatively, living polymerization may be used, or polymerization in which chain transfer proceeds may be employed.

Further alternatively, using a so-called chain shuttling agent (CSA), a chain shuttling reaction or coordinative chain transfer polymerization (CCTP) may be conducted.

The specific production process and conditions are disclosed in, for example, Japanese Unexamined Patent Publication Nos. 2010-260913 and 2010-202647. When the above-mentioned transition metal catalyst is used in a polymerization reaction for the polymerization of the polar group-containing multi-component olefin copolymer, the catalyst is removed by a well-known method, such as filtration or a reprecipitation operation, but a metal derived from the catalyst may remain in a very small amount in the obtained copolymer. The presence of such a metal element shows that the copolymer is produced using a transition metal catalyst, and an embodiment of the present invention is directed to the polar group-containing multi-component olefin copolymer which contains a transition metal element belonging to Group 10 of the Periodic Table, particularly nickel or palladium, which has been used as a polymerization catalyst. The transition metal content of the copolymer can be measured by a method, such as ICP-OES. When a transition metal element is contained in the copolymer, the transition metal content of the copolymer is 20,000 μg or less, preferably 10,000 μg or less, further preferably 5,000 μg/g or less, especially preferably 2,000 μg/g or less, most preferably 1,000 μg/g or less. The metal content is inversely proportional to the polymerization activity, and, when the activity is increased, the metal content is reduced. That is, as the activity becomes higher, the metal content is close to zero.

(6) Additive

In the polar group-containing multi-component olefin copolymer of the present disclosure, an additive, such as an antioxidant, a light stabilizer, an ultraviolet light absorber, a metallic soap, a hydrochloric acid absorber, a lubricant, an antistatic agent, an anti-blocking agent, a colorant, a pigment, a crosslinking agent, a foaming agent, a nucleating agent, a flame retardant, a conductor, or a filler, may be incorporated in an amount such that the effects aimed at by the present disclosure are not sacrificed.

The polar group-containing multi-component olefin copolymer of the present invention itself has excellent physical properties, such as transparency and compatibility, which are derived from the structural units of the copolymer, and is advantageously used as a material, such as a packaging material. Furthermore, a copolymer which can be used as a base resin for an ionomer can be obtained from the polar group-containing multi-component olefin copolymer of the present invention under conditions for a general deprotection reaction. By subjecting the copolymer to a deprotection reaction, a carboxyl group can be formed from the structure which forms a carboxyl group by an elimination reaction due to heat or an acid in structural units (B) contained in the polar group-containing multi-component olefin copolymer. With respect to the conditions, such as a temperature, reagents, an atmosphere for reaction, a solvent, the use of an additive, and a reactor, those described above in connection with structural units (B) can be employed. The polar group-containing multi-component olefin copolymer of the present invention is advantageously used as a raw material of a base resin for an ionomer.

EXAMPLES

Hereinbelow, the present invention will be described in more detail with reference to the following Examples and Comparative Examples, which should not be construed as limiting the scope of the present invention.

[Method for Evaluating a Copolymer]

(1) Melting Point Tm, Heat of Fusion ΔH, and Crystallinity

A melting point Tm of the produced olefin copolymer was determined by the DSC measurement described below.

Using "EXSTAR6000", manufactured by Seiko Instruments Inc., a melting point Tm was determined by measurement conducted by maintaining the temperature at 40° C. for one minute, increasing the temperature from 40° C. to 160° C. at 10° C./minute, maintaining the temperature at 160° C. for 10 minutes, decreasing the temperature from 160° C. to 10° C. at 10° C./minute, maintaining the temperature at 10° C. for 5 minutes, and then increasing the temperature from 10° C. to 160° C. at 10° C./minute.

A crystallinity was determined by determining a heat of fusion ΔH from the fusion endothermic peak area obtained when increasing the temperature from room temperature to 160° C., and dividing the determined ΔH by the heat of fusion (293 J/g) of polyethylene (HDPE) perfect crystal.

(2) Molecular Weight Distribution Parameter Mw/Mn

A molecular weight distribution parameter Mw/Mn of the produced olefin polymer was measured by GPC.

Apparatus: Model Alliance GPCV2000, manufactured by Nihon Waters K.K.

Detector: Differential refractive index detector having GPCV2000 incorporated

Preparation of a Sample:

3 mg of a sample and 3 mL of orthodichlorobenzene (containing 1,2,4-trimethylphenol in an amount of 0.1 mg/mL) were weighed and placed in a 4 mL vial, and the vial was covered with a screw cap made of a resin and a septum made of Teflon (registered trademark), and then the sample was dissolved using high-temperature shaking apparatus Model SSC-9300, manufactured by Senshu Scientific Co., Ltd., having a temperature set to 150° C. for 2 hours. After completion of the dissolution, the visual observation confirmed that there was no insoluble component.

Columns: Shodex HT-806M, manufactured by Showa Denko K.K.×2+ShodexHT-G, manufactured by Showa Denko K.K.×1

Preparation of an HT-G Calibration Curve:

Four 4 mL glass bottles were provided, and 0.2 mg of each of monomodal polystyrene standard samples or a n-alkane in combinations (i) to (iv) below was weighed and placed in each of the glass bottles, and subsequently 3 mL of orthodichlorobenzene (containing 1,2,4-trimethylphenol in an amount of 0.1 mg/mL) was weighed and placed in the glass bottle, and the bottle was covered with a screw cap made of a resin and a septum made of Teflon (registered trademark), and then the sample was dissolved using high-temperature shaking apparatus Model SSC-9300, manufactured by Senshu Scientific Co., Ltd., having a temperature set to 150° C. for 2 hours.

(i) Shodex S-1460, Shodex S-66.0, n-eicosane
(ii) Shodex S-1950, Shodex S-152, n-tetracontane
(iii) Shodex S-3900, Shodex S-565, Shodex S-5.05
(iv) Shodex S-7500, Shodex S-1010, Shodex S-28.5

The vial containing a sample solution was set in the apparatus, and subjected to measurement under the above-mentioned conditions, and a chromatogram (data set of a retention time and a response of the differential refractive index detector) at a sampling interval of 1 s was recorded. From the obtained chromatogram, a retention time (peak top) of each polystyrene standard sample was read and plotted for the logarithm of the molecular weight. The molecular weights of n-eicosane and n-tetracontane were 600 and 1,200, respectively. A method of non-linear least squares was applied to the plotted values, and the obtained biquadratic curve was used as a calibration curve.

Calculation of a molecular weight: Measurement was conducted under the above-mentioned conditions, and a chromatogram at a sampling interval of 1 s was recorded. Using the chromatogram, a differential molecular weight distribution curve and average molecular weight values (Mn, Mw, and Mz) were calculated by the method described in "Size Exclusion Chromatography", written by Sadao Mori (Kyoritsu Shuppan Co., Ltd.), Chapter 4, p. 51 to 60. For correcting the molecular weight dependency of dn/dc, a height H from the base line in the chromatogram was corrected using the formula shown below (H'=Corrected H). Recording a chromatogram (taking data) and calculation of an average molecular weight were conducted using the program made by ourselves (using Visual Basic 6.0, by Microsoft Corporation) on the PC having installed Microsoft OS Windows (registered trademark) XP, manufactured by Microsoft Corporation.

$$H'=H/[1.032+189.2/M(PE)]$$

In conversion of the molecular weight of polystyrene to that of polyethylene, the following formula was used.

$$M(PE)=0.468 \times M(PS)$$

Measuring temperature: 145° C.
Concentration: 20 mg/10 mL
Amount of a sample per injection: 0.2 ml
Solvent: Orthodichlorobenzene
Flow rate: 1.0 ml/minute (3) Comonomer Content A comonomer content of the produced olefin copolymer was determined by conducting the measurement described below.

Method for Measuring a Structural Unit Amount for a Polar Group-Containing Monomer of the Polar Group-Containing Multi-Component Olefin Copolymer:

A structural unit amount for a polar group of the polar group-containing multi-component olefin copolymer of the present invention can be determined using a $^{13}$C-NMR spectrum. A $^{13}$C-NMR spectrum is measured by the following method.

1) 200 to 250 mg of a sample is placed in an NMR sample tube having an inner diameter of 10 mmϕ, together with 2.4 ml of o-dichlorobenzene/deuterated bromobenzene ($C_6D_5Br$)=4/1 (volume ratio) and hexamethyldisiloxane as a chemical shift standard substance, and the tube is purged with nitrogen gas and then sealed, and the sample is dissolved by heating to obtain a uniform solution, and the solution is subjected to NMR measurement.

The NMR measurement was conducted using NMR apparatus Model AV400, manufactured by Bruker Japan K.K., having 10 mmϕ CryoProbe attached.

The $^{13}$C-NMR measurement was performed by an inverse gated decoupling method under conditions such that the sample temperature was 120° C., the pulse angle was 90°, the pulse interval was 51.5 seconds, and the accumulation number was 512 or more.

With respect to the chemical shift, a $^{13}$C signal of hexamethyldisiloxane was set to 1.98 ppm, and, using this signal as a reference, chemical shifts of other $^{13}$C signals were determined.

4) Analysis Method for the Comonomer Content

<E/tBA>

In the $^{13}$C-NMR spectrum, a quaternary carbon signal of the t-butyl acrylate group of tBA is detected at 79.6 to 78.8.

Using the signal strength, a comonomer content was calculated from the following formulae.

$$tBA\ \text{total amount(mol \%)} = I_{(tBA)} \times 100/[I_{(tBA)} + I_{(E)}]$$

$I_{(tBA)}$ and $I_{(E)}$ are amounts represented by the following respective formulae.

$$I_{(tBA)} = I_{79.6\ to\ 78.8}$$

$$I_{(E)} = (I_{180.0\ to\ 135.0} + I_{120.0\ to\ 2.0} - I_{(tBA)} \times 7)/2$$

<E/tBA/nBA>

In the $^{13}$C-NMR spectrum, a quaternary carbon signal of the t-butyl acrylate group of tBA is detected at 79.6 to 78.8 ppm, and a methylene signal of the butoxy group of nBA is detected at 64.1 to 63.4 ppm. Using these signal strengths, a comonomer content was calculated from the following formulae.

$$tBA\ \text{total amount(mol \%)} = I_{(tBA)} \times 100/[I_{(tBA)} + I_{(nBA)} + I_{(E)}]$$

$$nBA\ \text{total amount(mol \%)} = I_{(nBA)} \times 100/[I_{(tBA)} + I_{(nBA)} + I_{(E)}]$$

$I_{(tBA)}$, $I_{(nBA)}$, and $I_{(E)}$ are amounts represented by the following respective formulae.

$$I_{(tBA)} = I_{79.6\ to\ 78.8}$$

$$I_{(nBA)} = I_{64.1\ to\ 63.4}$$

$$I_{(E)} = (I_{180.0\ to\ 135.0} + I_{120.0\ to\ 2.0} - I_{(nBA)} \times 7 - I_{(tBA)} \times 7)/2$$

<E/tBA/iBA>

In the $^{13}$C-NMR spectrum, a quaternary carbon signal of the t-butyl acrylate group of tBA is detected at 79.6 to 78.8 ppm, a methylene signal of the isobutoxy group of iBA is detected at 70.5 to 69.8 ppm, and a methyl signal of the isobutoxy group is detected at 19.5 to 18.9 ppm. Using these signal strengths, a comonomer content was calculated from the following formulae.

$$tBA\ \text{total amount(mol \%)} = I_{(tBA)} \times 100/[I_{(tBA)} + I_{(iBA)} + I_{(E)}]$$

$$iBA\ \text{total amount(mol \%)} = I_{(iBA)} \times 100/[I_{(tBA)} + I_{(iBA)} + I_{(E)}]$$

$I_{(tBA)}$, $I_{(iBA)}$, and $I_{(E)}$ are amounts represented by the following respective formulae.

$$I_{(tBA)} = I_{79.6\ to\ 78.8}$$

$$I_{(iBA)} = (I_{70.5\ to\ 69.8} + I_{19.5\ to\ 18.9})/3$$

$$I_{(E)} = (I_{180.0\ to\ 135.0} + I_{120.0\ to\ 2.0} - I_{(iBA)} \times 7 - I_{(tBA)} \times 7)/2$$

<E/tBA/MA>

In the $^{13}$C-NMR spectrum, a quaternary carbon signal of the t-butyl acrylate group of tBA is detected at 79.6 to 78.8, and a methyl carbon signal of the methoxy group of methyl acrylate (MA) is detected at 51.1 to 50.4 ppm. Using these signal strengths, a comonomer content was calculated from the following formulae.

$$tBA\ \text{total amount(mol \%)} = I_{(tBA)} \times 100/[I_{(tBA)} + I_{(MA)} + I_{(E)}]$$

$$MA\ \text{total amount(mol \%)} = I_{(MA)} \times 100/[I_{(tBA)} + I_{(MA)} + I_{(E)}]$$

$I_{(tBA)}$, $I_{(MA)}$, and $I_{(E)}$ are amounts represented by the following respective formulae.

$$I_{(tBA)} = I_{79.6\ to\ 78.8}$$

$$I_{(MA)} = I_{51.1\ to\ 50.4}/2$$

$$I_{(E)} = (I_{180.0\ to\ 135.0} + I_{120.0\ to\ 2.0} - I_{(MA)} \times 4 - I_{(tBA)} \times 7)/2$$

<E/tBA/EA>

In the $^{13}$C-NMR spectrum, a quaternary carbon signal of the t-butyl acrylate group of tBA is detected at 79.6 to 78.8 ppm, a methyl carbon signal of the ethoxy group of ethyl acrylate (EA) is detected at 14.7 to 14.1 ppm, and a methylene carbon signal is detected at 60.0 to 59.3 ppm. Using these signal strengths, a comonomer content was calculated from the following formulae.

$$tBA\ \text{total amount(mol \%)} = I_{(tBA)} \times 100/[I_{(tBA)} + I_{(EA)} + I_{(E)}]$$

$$EA\ \text{total amount(mol \%)} = I_{(EA)} \times 100/[I_{(tBA)} + I_{(EA)} + I_{(E)}]$$

$I_{(tBA)}$, $I_{(EA)}$, and $I_{(E)}$ are amounts represented by the following respective formulae.

$$I_{(tBA)} = I_{79.6\ to\ 78.8}$$

$$I_{(EA)} = (I_{14.7\ to\ 14.1} + I_{60.0\ to\ 59.3})/2$$

$$I_{(E)} = (I_{180.0\ to\ 135.0} + I_{120.0\ to\ 2.0} - I_{(EA)} \times 5 - I_{(tBA)} \times 7)/2$$

<E/tBA/C6>

In the $^{13}$C-NMR spectrum, a quaternary carbon signal of the t-butyl acrylate group of tBA is detected at 79.6 to 78.8 ppm, and a methylene signal of 1-hexene is detected at 23.4 to 23.1 ppm. Using these signal strengths, a comonomer content was calculated from the following formulae.

$$tBA\ \text{total amount (mol \%)} = I_{(tBA)} \times 100/[I_{(tBA)} + I_{(C6)} + I_{(E)}]$$

$$C6\ \text{total amount (mol \%)} = I_{(C6)} \times 100/[I_{(tBA)} + I_{(C6)} + I_{(E)}]$$

$I_{(tBA)}$, $I_{(C6)}$, and $I_{(E)}$ are amounts represented by the following respective formulae.

$$I_{(tBA)} = I_{79.6\ to\ 78.8}$$

$$I_{(C6)} = I_{23.4\ to\ 23.1}$$

$$I_{(E)} = (I_{180.0\ to\ 135.0} + I_{120.0\ to\ 2.0} - I_{(C6)} \times 6 - I_{(tBA)} \times 7)/2$$

<E/tBA/VA>

In the $^{13}$C-NMR spectrum, a quaternary carbon signal of the t-butyl acrylate group of tBA is detected at 79.6 to 78.8 ppm, and a methyl signal of vinyl acetate is detected at 20.9 to 20.2 ppm. Using these signal strengths, a comonomer content was calculated from the following formulae.

$$tBA\ \text{total amount(mol \%)} = I_{(tBA)} \times 100/[I_{(tBA)} + I_{(VA)} + I_{(E)}]$$

$$VA\ \text{total amount(mol \%)} = I_{(VA)} \times 100/[I_{(tBA)} + I_{(VA)} + I_{(E)}]$$

$I_{(tBA)}$, $I_{(VA)}$, and $I_{(E)}$ are amounts represented by the following respective formulae.

$$I_{(tBA)} = I_{79.6\ to\ 78.8}$$

$$I_{(VA)} = I_{20.9\ to\ 20.2}$$

$$I_{(E)} = (I_{180.0\ to\ 135.0} + I_{120.0\ to\ 2.0} - I_{(VA)} \times 4 - I_{(tBA)} \times 7)/2$$

<E/tBA/MMA>

In the $^{13}$C-NMR spectrum, a quaternary carbon signal of the t-butyl acrylate group of tBA is detected at 79.6 to 78.8 ppm, and a methoxy signal of methyl methacrylate is detected at 52.5 to 49.5 ppm. Using these signal strengths, a comonomer content was calculated from the following formulae.

$$tBA \text{ total amount(mol \%)} = I_{(tBA)} \times 100 / [I_{(tBA)} + I_{(MMA)} + I_{(E)}]$$

$$MMA \text{ total amount(mol \%)} = I_{(MMA)} \times 100 / [I_{(tBA)} + I_{(MMA)} + I_{(E)}]$$

$I_{(tBA)}$, $I_{(MMA)}$, and $I_{(E)}$ are amounts represented by the following respective formulae.

$$I_{(tBA)} = I_{79.6 \text{ to } 78.8}$$

$$I_{(MMA)} = I_{52.5 \text{ to } 49.5}$$

$$I_{(E)} = (I_{180.0 \text{ to } 135.0} + I_{120.0 \text{ to } 2.0} - I_{(MMA)} \times 5 - I_{(tBA)} \times 7)/2$$

In the following description, when a comonomer content is represented by "<0.1" including an inequal sign, this means that the comonomer is present as constituent units in the copolymer, but the content is less than 0.1 mol %, taking the significant figure into consideration.

(4) Tensile Test

Using each of the resins in the Examples and Comparative Examples, a sheet having a thickness of 1 mm was prepared by the method (cooling method A) described in JIS K7151 (1995), and, using a 5B type small-size test specimen described in JIS K7162 (1994), which was prepared by punching the above-obtained sheet, a tensile test was conducted under conditions at a temperature of 23° C. in accordance with JIS K7161 (2014) to measure a tensile modulus, a tensile stress at break, and a tensile elongation at break. The test rate was 10 mm/minute.

(5) Tensile Impact Strength Test

1) Method for Preparing a Tensile Impact Strength Test Sample

With respect to each of the resins in the Examples and Comparative Examples, the resin was placed in a mold for hot pressing having a thickness of 1 mm, and preheated in a hot pressing machine having a surface temperature of 180° C. for 5 minutes, and then a cycle of application of the pressure and reduction of the pressure was repeated for melting the resin and for deaeration of the gas remaining in the molten resin, and further a pressure of 4.9 MPa was applied to the resin and maintained for 5 minutes. Then, the resin was gradually cooled at a rate of 10° C./minute in the state of applying a pressure of 4.9 MPa, and, at a time when the temperature was reduced to around room temperature, the molded plate was removed from the mold. The obtained molded plate was conditioned in an environment at a temperature of 23±2° C. and at a humidity of 50±5° C. for 48 hours or longer. From the conditioned pressed plate, a test specimen having an ASTM D1822 Type-S shape was punched and used as a tensile impact strength test sample.

2) Conditions for Tensile Impact Strength Test

Using each of the resins in the Examples and Comparative Examples, a tensile impact strength was measured with reference to JIS K 7160-1996 Method B. Only the shape of a test specimen is different from that in JIS K 7160-1996. Other conditions for measurement were in accordance with the method of JIS K 7160-1996, and a test was conducted according to this method to measure a tensile impact strength.

(6) Phase Angle δ (G*=0.1 MPa) at a Complex Modulus Absolute Value G* of 0.1 MPa With respect to each of the resins in the Examples and Comparative Examples, the resin was placed in a mold for hot pressing having a thickness of 1.0 mm, and preheated in a hot pressing machine having a surface temperature of 180° C. for 5 minutes, and then a cycle of application of the pressure and reduction of the pressure was repeated for deaeration of the gas remaining in the molten resin, and further a pressure of 4.9 MPa was applied to the resin and maintained for 5 minutes. Then, the resultant resin was transferred to a pressing machine having a surface temperature of 25° C., and cooled by maintaining it at a pressure of 4.9 MPa for 3 minutes, preparing a pressed plate formed from a specimen having a thickness of about 1.0 mm. The pressed plate formed from the specimen was processed into a circular form having a diameter of 25 mm and used as a sample, and, using rotational rheometer Model ARES, manufactured by Rheometrics, Inc., as a measurement apparatus for dynamic viscoelastic properties, dynamic viscoelastic properties were measured in a nitrogen gas atmosphere under the following conditions.

Plate: +25 mm Parallel plate
Temperature: 160° C.
Strain amount: 10%
Measuring range of circular frequency: $1.0 \times 10^{-2}$ to $1.0 \times 10^2$ rad/s
Measurement interval: 5 points/decade A phase angle S was plotted for the common logarithm log G* of a complex modulus absolute value G*(Pa), and a δ (degree) value of the point corresponding to log G*=5.0 was taken as δ (G*=0.1 MPa). When the point corresponding to log G*=5.0 was not present in the measured points, a δ value of the point for log G*=5.0 was determined by linear interpolation using two points around log G*=5.0. Further, when all the measured points corresponded to log G*<5, a δ value of the point for log G*=5.0 was determined by extrapolation using a quadratic curve using three points of the larger log G* values.

(7) IR Spectrum Analysis of Change from the Ester Structure to a Carboxylic Acid Structure The copolymer was molten at 180° C. for 3 minutes, and subjected to compression molding to prepare a film having a thickness of about 50 μm. The prepared film was subjected to analysis by Fourier transform infrared spectroscopy, obtaining an infrared absorption spectrum of the copolymer.

Product name: FT/IR-6100_, manufactured by JASCO Corporation
Measurement method: Transmission method
Detector: TGS
Accumulation number: Auto (16 to 64)
Resolving power: 4.0 cm$^{-1}$
Measuring wavelength: 5,000 to 500 cm$^{-1}$ (8) Number of Methyl Branches Per 1,000 Carbon Atoms $^{13}$C-NMR was used for quantitatively determining the number of methyl branches. The $^{13}$C-NMR measurement was performed by an inverse gated decoupling method under conditions such that the sample temperature was 120° C., the pulse angle was 90°, the pulse interval was 51.5 seconds, and the accumulation number was 512 or more.

With respect to the chemical shift, a $^{13}$C signal of hexamethyldisiloxane was set to 1.98 ppm, and, using this signal as a reference, chemical shifts of other $^{13}$C signals were determined, and, from the area ratio of the signal of a methyl group derived from a methyl branch, the number of methyl branches was quantitatively determined. The method for quantitatively determining the number of methyl branches by $^{13}$C-NMR is well known by those skilled in the art.

(9) Metal Content of a Copolymer

ICP-OES was used for quantitatively determining a metal content. About 0.1 to 0.3 g of a sample was placed in a Kjeldahl flask, and sulfuric acid was added thereto and the sample was heated and subjected to wet decomposition. The resultant decomposition product solution was transferred to a measuring flask. The volume of the solution was determined, and a content of Ni in the solution was measured by ICP-OES.

Product name: ICP-OES, Model iCAP6500DUO, manufactured by Thermo Fisher

Scientific K.K.

(10) Vp Activity

A productivity (Vp activity) of the produced olefin copolymer was calculated from the following formula.

Productivity(Vp activity)={Yield (kg) of the produced olefin copolymer}÷{Catalyst amount (mol)×Polymerization time (h)}

[Metal Complex]

A B-27DM/Ni complex was synthesized in accordance with the synthesis example described in Japanese Unexamined Patent Publication No. 2013-043871, and ligand B-27DM represented by the chemical formula below was used. Further, in accordance with the Examples of International Patent Publication No. WO2010/050256, using bis-1,5-cyclooctadienenickel(0) (referred to as "Ni(COD)$_2$"), a nickel complex having B-27DM and Ni(COD)$_2$ which had been reacted in a 1:1 ratio (molar ratio) was synthesized.

In the formula below, "Me" indicates a methyl group, and "C$_6$F$_5$" indicates a pentafluorophenyl group.

[Chemical formula 9]

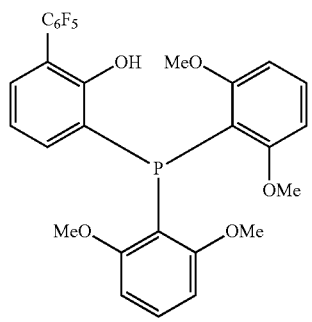

B-27 DM

As a B-423/Ni catalyst, ligand B-423 represented by the chemical formula below was used. Ni(acac)$_2$ (51.4 mg) was weighed and placed in a 50 ml eggplant-shaped flask, and dissolved in toluene (10 ml) to prepare a 20 mM toluene solution of Ni(acac)$_2$. The obtained solution was blue and transparent. The obtained toluene solution (10 ml) of Ni(acac)$_2$ was added to an eggplant-shaped flask having B-423 (111.7 mg) therein and stirred at room temperature for one minute to obtain a violet and transparent solution. A concentration of the reaction product was calculated on the assumption that B-423 and Ni(acac)$_2$ are reacted in a 1:1 ratio to form a nickel complex.

In the formula below, "Me" indicates a methyl group, and "iPr" indicates an isopropyl group.

[Chemical formula 10]

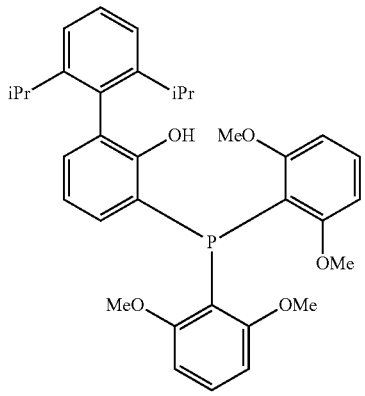

B-423

EXAMPLES AND COMPARATIVE EXAMPLES

Example 1

1) Production of an Ethylene/t-Butyl Acrylate (tBA)/n-Butyl Acrylate (nBA) Terpolymer (E/tBA/nBA):

Into an autoclave having an agitating blade and having an internal volume of 2.4 liters were charged dried toluene (1.0 liter), 55 mg (0.15 mmol) of tri-n-octylaluminum (TNOA), 8.7 ml (60 mmol) (predetermined amount) of t-butyl acrylate (tBA: comonomer 1), and 4.3 ml (30 mmol) (predetermined amount) of n-butyl acrylate (nBA: comonomer 2).

While stirring, the temperature in the autoclave was increased to 90° C., and nitrogen was fed until the pressure became 0.2 MPa, and then ethylene was fed to the autoclave, and the autoclave was conditioned so that the pressure became 1.0 MPa.

After completion of the conditioning, 10 ml (200 μmol of B-27DM/Ni catalyst was charged under a pressure using nitrogen to initiate copolymerization.

Polymerization was conducted for 38 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/nBA resin 1. The results are shown in Tables 1 and 2. The result of Ni quantitative analysis by ICP-OES was 980 μg/g.

2) Preparation of an Ethylene/Acrylic Acid (AA)/n-Butyl Acrylate (nBA) Terpolymer (E/AA/nBA) by Modification:

Into a separable flask having a capacity of 50 ml were charged 4 g of the above-obtained resin 1, 0.08 g of paratoluenesulfonic acid monohydrate, and 18.5 ml of toluene, and the resultant mixture was stirred at 105° C. for 4 hours. 18.5 ml of ion-exchanged water was added and the resultant mixture was stirred and allowed to stand, and then the aqueous layer was withdrawn. Subsequently, until the pH of the withdrawn aqueous layer became 5 or more, an operation of adding ion-exchanged water and withdrawing the aqueous layer was repeatedly performed. The solvent was removed from the remaining solution by evaporation under a reduced pressure, and the resultant residue was dried until it had a constant weight, obtaining E/AA/nBA resin I. The results of the measurement of physical properties are shown in Table 3.

In the IR spectrum of the obtained resin I, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid. The result of Ni quantitative analysis by ICP-OES was 960 µg/g.

Example 2

1) Production of an Ethylene/t-Butyl Acrylate (tBA)/Isobutyl Acrylate (iBA) Terpolymer (E/tBA/iBA):

Into an autoclave having an agitating blade and having an internal volume of 2.4 liters were charged dried toluene (1.0 liter), 55 mg (0.15 mmol) of TNOA, 8.7 ml (60 mmol) (predetermined amount) of t-butyl acrylate (tBA: comonomer 1), and 4.3 ml (30 mmol) (predetermined amount) of isobutyl acrylate (iBA: comonomer 2).

While stirring, the temperature in the autoclave was increased to 90° C., and nitrogen was fed until the pressure became 0.2 MPa, and then ethylene was fed to the autoclave, and the autoclave was conditioned so that the pressure became 1.0 MPa.

After completion of the conditioning, 10 ml (200 µmol) of B-27DM/Ni catalyst was charged under a pressure using nitrogen to initiate copolymerization.

Polymerization was conducted for 45 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/iBA resin 2. The results are shown in Tables 1 and 2. The result of Ni quantitative analysis by ICP-OES was 1,130 µg/g.

2) Preparation of an Ethylene/Acrylic Acid (AA)/Isobutyl Acrylate (iBA) Terpolymer (E/AA/iBA) by Modification:

Using the above-obtained resin 2, E/AA/iBA resin II was obtained in the same manner as in item 2) in Example 1. The results of the measurement of physical properties are shown in Table 3.

In the IR spectrum of the obtained resin II, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased.

This result confirmed decomposition of the t-butyl ester and formation of a carboxylic acid. The result of Ni quantitative analysis by ICP-OES was 960 µg/g.

Example 3

1) Production of an Ethylene/t-Butyl Acrylate (tBA)/Methyl Acrylate (MA) Terpolymer (E/tBA/MA):

Into an autoclave having an agitating blade and having an internal volume of 2.4 liters were charged dried toluene (1.0 liter), 73 mg (0.20 mmol) of TNOA, 8.7 ml (60 mmol) (predetermined amount) of t-butyl acrylate (tBA: comonomer 1), and 2.7 ml (30 mmol) (predetermined amount) of methyl acrylate (MA: comonomer 2).

While stirring, the temperature in the autoclave was increased to 90° C., and nitrogen was fed until the pressure became 0.2 MPa, and then ethylene was fed to the autoclave, and the autoclave was conditioned so that the pressure became 1.0 MPa.

After completion of the conditioning, 10 ml (200 µmop of B-27DM/Ni catalyst was charged under a pressure using nitrogen to initiate copolymerization.

Polymerization was conducted for 75 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/MA resin 3. The results are shown in Tables 1 and 2. The result of Ni quantitative analysis by ICP-OES was 960 µg/g.

2) Preparation of an Ethylene/Acrylic Acid (AA)/Methyl Acrylate (MA) Terpolymer (E/AA/MA) by Modification:

Using the above-obtained resin 3, E/AA/MA resin III was obtained in the same manner as in item 2) in Example 1. The results of the measurement of physical properties are shown in Table 3.

In the IR spectrum of the obtained resin III, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased.

This result confirmed decomposition of the t-butyl ester and formation of a carboxylic acid. The result of Ni quantitative analysis by ICP-OES was 950 µg/g.

Example 4

1) Production of an Ethylene/t-Butyl Acrylate (tBA)/Ethyl Acrylate (EA) Terpolymer (E/tBA/EA):

Into an autoclave having an agitating blade and having an internal volume of 2.4 liters were charged dried toluene (1.0 liter), 73 mg (0.20 mmol) of TNOA, 8.7 ml (60 mmol) (predetermined amount) of t-butyl acrylate (tBA: comonomer 1), and 3.3 ml (30 mmol) (predetermined amount) of ethyl acrylate (EA: comonomer 2).

While stirring, the temperature in the autoclave was increased to 90° C., and nitrogen was fed until the pressure became 0.2 MPa, and then ethylene was fed to the autoclave, and the autoclave was conditioned so that the pressure became 1.0 MPa.

After completion of the conditioning, 10 ml (200 µmop of B-27DM/Ni catalyst was charged under a pressure using nitrogen to initiate copolymerization.

Polymerization was conducted for 49 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/EA resin 4. The results are shown in Tables 1 and 2. The result of Ni quantitative analysis by ICP-OES was 1,000 µg/g.

2) Preparation of an Ethylene/Acrylic Acid (AA)/Methyl Acrylate (EA) Terpolymer (E/AA/EA) by Modification:

Using the above-obtained resin 4, E/AA/EA resin IV was obtained in the same manner as in item 2) in Example 1. The results of the measurement of physical properties are shown in Table 3.

In the IR spectrum of the obtained resin IV, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased.

This result confirmed decomposition of the t-butyl ester and formation of a carboxylic acid. The result of Ni quantitative analysis by ICP-OES was 930 μg/g.

Comparative Example 1

1) Production of an Ethylene/t-Butyl Acrylate (tBA)/1-Hexene (C6) Terpolymer (E/tBA/C6):

Into an autoclave having an agitating blade and having an internal volume of 2.4 liters were charged dried toluene (1.0 liter), 55 mg (0.15 mmol) of TNOA, 8.7 ml (60 mmol) (predetermined amount) of t-butyl acrylate (tBA: comonomer 1), and 3.8 ml (30 mmol) (predetermined amount) of 1-hexene (C6: comonomer 2).

While stirring, the temperature in the autoclave was increased to 90° C., and nitrogen was fed until the pressure became 0.2 MPa, and then ethylene was fed to the autoclave, and the autoclave was conditioned so that the pressure became 1.0 MPa.

After completion of the conditioning, 10 ml (200 μmol) of B-27DM/Ni catalyst was charged under a pressure using nitrogen to initiate copolymerization.

Polymerization was conducted for 22 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/C6 resin 5. The results are shown in Tables 1 and 2. The result of Ni quantitative analysis by ICP-OES was 770 μg/g.

2) Preparation of an Ethylene/Acrylic Acid (AA)/1-Hexene (C6) Terpolymer (E/AA/C6) by Modification:

Using the above-obtained resin 5, E/AA/C6 resin V was obtained in the same manner as in item 2) in Example 1. The results of the measurement of physical properties are shown in Table 3.

In the IR spectrum of the obtained resin V, the peak around 1,730 cm$^{-1}$ ascribed to a carbonyl group of an ester and the peak around 850 cm' ascribed to a t-butyl group of a t-butyl ester disappeared, and the peak around 1,700 cm$^{-1}$ ascribed to a carbonyl group of a carboxylic acid (dimer) was increased. This result confirmed that thermal decomposition of the ester was made. The result of Ni quantitative analysis by ICP-OES was 750 μg/g.

Comparative Example 2

1) Production of an Ethylene/t-Butyl Acrylate (tBA)/Vinyl Acetate (VA) Terpolymer (E/tBA/VA):

Into an autoclave having an agitating blade and having an internal volume of 2.4 liters were charged dried toluene (1.0 liter), 55 mg (0.15 mmol) of TNOA, 8.7 ml (60 mmol) (predetermined amount) of t-butyl acrylate (tBA: comonomer 1), and 2.8 ml (30 mmol) (predetermined amount) of vinyl acetate (VA: comonomer 2).

While stirring, the temperature in the autoclave was increased to 90° C., and nitrogen was fed until the pressure became 0.2 MPa, and then ethylene was fed to the autoclave, and the autoclave was conditioned so that the pressure became 1.0 MPa.

After completion of the conditioning, 10 ml (200 μmol) of B-27DM/Ni catalyst was charged under a pressure using nitrogen to initiate copolymerization.

Polymerization was conducted for 52 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/VA resin 6. The results are shown in Tables 1 and 2. The result of Ni quantitative analysis by ICP-OES was 880 μg/g.

2) Preparation of an Ethylene/Acrylic Acid (AA)/Vinyl Acetate (VA) Terpolymer (E/AA/VA) by Modification:

Using the above-obtained resin 6, E/AA/VA resin VI was obtained in the same manner as in item 2) in Example 1. The results of the measurement of physical properties are shown in Table 3.

In the IR spectrum of the obtained resin VI, the peak around 1,730 cm$^{-1}$ ascribed to a carbonyl group of an ester and the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed that thermal decomposition of the ester was made. The result of Ni quantitative analysis by ICP-OES was 860 μg/g.

Comparative Example 3

1) Production of an Ethylene/t-Butyl Acrylate (tBA)/Methyl Methacrylate (MMA) Terpolymer (E/tBA/MMA):

Into an autoclave having an agitating blade and having an internal volume of 2.4 liters were charged dried toluene (1.0 liter), 55 mg (0.15 mmol) of TNOA, 8.7 ml (60 mmol) (predetermined amount) of t-butyl acrylate (tBA: comonomer 1), and 3.2 ml (30 mmol) (predetermined amount) of methyl methacrylate (MMA: comonomer 2).

While stirring, the temperature in the autoclave was increased to 90° C., and nitrogen was fed until the pressure became 0.2 MPa, and then ethylene was fed to the autoclave, and the autoclave was conditioned so that the pressure became 1.0 MPa.

After completion of the conditioning, 10 ml (200 mop of B-27DM/Ni catalyst was charged under a pressure using nitrogen to initiate copolymerization.

Polymerization was conducted for 23 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/MMA resin 7. The results are shown in Tables 1 and 2. The result of Ni quantitative analysis by ICP-OES was 800 μg/g.

2) Preparation of an Ethylene/Acrylic Acid (AA)/Methyl Methacrylate (MMA) Terpolymer (E/AA/MMA) by Modification:

Using the above-obtained resin 7, E/AA/VA resin VII was obtained in the same manner as in item 2) in Example 1. The results of the measurement of physical properties are shown in Table 3.

In the IR spectrum of the obtained resin VII, the peak around 1,730 cm$^{-1}$ ascribed to a carbonyl group of an ester and the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed that thermal decomposition of the ester was made. The result of Ni quantitative analysis by ICP-OES was 780 μg/g.

Example 5

1) Production of an Ethylene/t-Butyl Acrylate (tBA)/n-Butyl Acrylate (nBA) Terpolymer (E/tBA/nBA):

Into an autoclave having an agitating blade and having an internal volume of 2.4 liters were charged dried toluene (1.0 liter), 55 mg (0.15 mmol) of TNOA, 29.1 ml (200 mmol) (predetermined amount) of t-butyl acrylate (tBA: comonomer 1), and 8.6 ml (60 mmol) (predetermined amount) of n-butyl acrylate (nBA: comonomer 2).

While stirring, the temperature in the autoclave was increased to 90° C., and nitrogen was fed until the pressure became 0.3 MPa, and then ethylene was fed to the autoclave, and the autoclave was conditioned so that the pressure became 3.3 MPa.

After completion of the conditioning, 24 ml (480 μmol) of B-27DM/Ni catalyst was charged under a pressure using nitrogen to initiate copolymerization.

Polymerization was conducted for 92 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/nBA resin 8. The results are shown in Tables 4 and 6. The result of Ni quantitative analysis by ICP-OES was 210 μg/g. The "no data" shown in the table means that no measurement was made.

2) Preparation of an Ethylene/Acrylic Acid (AA)/n-Butyl Acrylate (nBA) Terpolymer (E/AA/nBA) by Modification:

Using the above-obtained resin 8, E/AA/nBA resin VIII was obtained in the same manner as in item 2) in Example 1. The results of the measurement of physical properties are shown in Table 8. The "no data" shown in the table means that no measurement was made.

In the IR spectrum of the obtained resin VIII, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid. The result of Ni quantitative analysis by ICP-OES was 210 μg/g.

Example 6

1) Production of an Ethylene/t-Butyl Acrylate (tBA)/n-Butyl Acrylate (nBA) Terpolymer (E/tBA/nBA):

Into an autoclave having an agitating blade and having an internal volume of 2.4 liters were charged dried toluene (1.0 liter), 55 mg (0.15 mmol) of TNOA, 29.1 ml (200 mmol) (predetermined amount) of t-butyl acrylate (tBA: comonomer 1), and 11.4 ml (80 mmol) (predetermined amount) of n-butyl acrylate (nBA: comonomer 2).

While stirring, the temperature in the autoclave was increased to 80° C., and nitrogen was fed until the pressure became 0.3 MPa, and then ethylene was fed to the autoclave, and the autoclave was conditioned so that the pressure became 3.3 MPa.

After completion of the conditioning, 24 ml (480 μmol) of B-27DM/Ni catalyst was charged under a pressure using nitrogen to initiate copolymerization.

Polymerization was conducted for 180 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/nBA resin 9. The results are shown in Tables 4 and 6. The result of Ni quantitative analysis by ICP-OES was 210 μg/g.

2) Preparation of an Ethylene/Acrylic Acid (AA)/n-Butyl Acrylate (AA) Terpolymer (E/BA/nBA) by Modification:

Using the above-obtained resin 9, E/AA/nBA resin IX was obtained in the same manner as in item 2) in Example 1. The results of the measurement of physical properties are shown in Table 8.

In the IR spectrum of the obtained resin IX, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid. The result of Ni quantitative analysis by ICP-OES was 210 μg/g.

Example 7

Production of an Ethylene/t-Butyl Acrylate (tBA)/n-Butyl Acrylate (nBA) Terpolymer (E/tBA/nBA):

Into an autoclave having an agitating blade and having an internal volume of 2.4 liters were charged dried toluene (1.0 liter), 55 mg (0.15 mmol) of TNOA, 29.1 ml (200 mmol) (predetermined amount) of t-butyl acrylate (tBA: comonomer 1), and 7.1 ml (50 mmol) (predetermined amount) of n-butyl acrylate (nBA: comonomer 2).

While stirring, the temperature in the autoclave was increased to 90° C., and nitrogen was fed until the pressure became 0.3 MPa, and then ethylene was fed to the autoclave, and the autoclave was conditioned so that the pressure became 3.3 MPa.

After completion of the conditioning, 18 ml (360 μmol) of B-27DM/Ni catalyst was charged under a pressure using nitrogen to initiate copolymerization.

Polymerization was conducted for 88 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/nBA resin 10. The results are shown in Tables 4 and 6. The result of Ni quantitative analysis by ICP-OES was 164 μg/g.

2) Preparation of an Ethylene/Acrylic Acid (AA)/n-Butyl Acrylate (nBA) Terpolymer (E/BA/nBA) by Modification:

Using the above-obtained resin 10, E/AA/nBA resin X was obtained in the same manner as in item 2) in Example 1. The results of the measurement of physical properties are shown in Table 8.

In the IR spectrum of the obtained resin X, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid. The result of Ni quantitative analysis by ICP-OES was 160 µg/g.

Example 8

Production of an Ethylene/t-Butyl Acrylate (tBA)/Isobutyl Acrylate (iBA) Terpolymer (E/tBA/iBA):

Into an autoclave having an agitating blade and having an internal volume of 2.4 liters were charged dried toluene (1.0 liter), 55 mg (0.15 mmol) of TNOA, 17.0 ml (115 mmol) (predetermined amount) of t-butyl acrylate (tBA: comonomer 1), and 14.0 ml (100 mmol) (predetermined amount) of isobutyl acrylate (iBA: comonomer 2).

While stirring, the temperature in the autoclave was increased to 90° C., and nitrogen was fed until the pressure became 0.3 MPa, and then ethylene was fed to the autoclave, and the autoclave was conditioned so that the pressure became 3.3 MPa.

After completion of the conditioning, 24 ml (480 µmol) of B-27DM/Ni catalyst was charged under a pressure using nitrogen to initiate copolymerization.

Polymerization was conducted for 120 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/iBA resin 11. The results are shown in Tables 4 and 6. The result of Ni quantitative analysis by ICP-OES was 240 µg/g.

2) Preparation of an Ethylene/Acrylic Acid (AA)/Isobutyl Acrylate (iBA) Terpolymer (E/BA/iBA) by Modification:

Using the above-obtained resin 11, E/AA/iBA resin XI was obtained in the same manner as in item 2) in Example 1. The results of the measurement of physical properties are shown in Table 8.

In the IR spectrum of the obtained resin XI, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid. The result of Ni quantitative analysis by ICP-OES was 230 µg/g.

Example 9

Production of an Ethylene/t-Butyl Acrylate (tBA)/Isobutyl Acrylate (iBA) Terpolymer (E/tBA/iBA):

Into an autoclave having an agitating blade and having an internal volume of 2.4 liters were charged dried toluene (1.0 liter), 55 mg (0.15 mmol) of TNOA, 28.0 ml (190 mmol) (predetermined amount) oft-butyl acrylate (tBA: comonomer 1), and 3.0 ml (22 mmol) (predetermined amount) of isobutyl acrylate (iBA: comonomer 2).

While stirring, the temperature in the autoclave was increased to 90° C., and nitrogen was fed until the pressure became 0.3 MPa, and then ethylene was fed to the autoclave, and the autoclave was conditioned so that the pressure became 3.3 MPa.

After completion of the conditioning, 24 ml (480 µmop of B-27DM/Ni catalyst was charged under a pressure using nitrogen to initiate copolymerization.

Polymerization was conducted for 55 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/iBA resin 12. The results are shown in Tables 4 and 6. The result of Ni quantitative analysis by ICP-OES was 200 µg/g.

2) Preparation of an Ethylene/Acrylic Acid (AA)/Isobutyl Acrylate (iBA) Terpolymer (E/BA/iBA) by Modification:

Using the above-obtained resin 12, E/AA/iBA resin XII was obtained in the same manner as in item 2) in Example 1. The results of the measurement of physical properties are shown in Table 8.

In the IR spectrum of the obtained resin XII, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid. The result of Ni quantitative analysis by ICP-OES was 190 µg/g.

Example 10

Production of an Ethylene/t-Butyl Acrylate (tBA)/Isobutyl Acrylate (iBA) Terpolymer (E/tBA/iBA):

Into an autoclave having an agitating blade and having an internal volume of 2.4 liters were charged dried toluene (1.0 liter), 55 mg (0.15 mmol) of TNOA, 27.5 ml (189 mmol) (predetermined amount) of t-butyl acrylate (tBA: comonomer 1), and 1.0 ml (7 mmol) (predetermined amount) of isobutyl acrylate (iBA: comonomer 2).

While stirring, the temperature in the autoclave was increased to 100° C., and nitrogen was fed until the pressure became 0.3 MPa, and then ethylene was fed to the autoclave, and the autoclave was conditioned so that the pressure became 3.3 MPa.

After completion of the conditioning, 24 ml (480 µmot) of B-27DM/Ni catalyst was charged under a pressure using nitrogen to initiate copolymerization.

Polymerization was conducted for 29 minutes, and then the autoclave was cooled and reduced in pressure, terminating the reaction.

The reaction solution was poured into one liter of acetone to cause a polymer to precipitate, and then the resultant polymer was recovered by filtration and washing, and further dried under a reduced pressure until the polymer had a constant weight, obtaining E/tBA/iBA resin 13. The results are shown in Tables 4 and 6. The result of Ni quantitative analysis by ICP-OES was 210 µg/g.

2) Preparation of an Ethylene/Acrylic Acid (AA)/Isobutyl Acrylate (iBA) Terpolymer (E/BA/iBA) by Modification:

Using the above-obtained resin 13, E/AA/iBA resin XIII was obtained in the same manner as in item 2) in Example 1. The results of the measurement of physical properties are shown in Table 8.

In the IR spectrum of the obtained resin XIII, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid. The result of Ni quantitative analysis by ICP-OES was 210 µg/g.

Example 11

1) Production of an Ethylene/t-Butyl Acrylate (tBA)/Isobutyl Acrylate (iBA) Terpolymer (E/tBA/iBA):

Into an autoclave having an agitating blade and having an internal volume of 1.6 m³ were charged dried toluene (1,000 liters), 0.0375 kg (0.256 mol) of TNOA, 4.4 kg (35 mol) (predetermined amount) of t-butyl acrylate (tBA: comonomer 1), and 1.6 kg (12 mol) of isobutyl acrylate (iBA: comonomer 2).

While stirring, the temperature in the autoclave was increased to 95° C., and then ethylene was fed to the autoclave, and the autoclave was conditioned so that the pressure became 0.8 MPa.

After completion of the conditioning, B-423/Ni catalyst was fed (3 mmol/minute) to perform copolymerization. During the reaction, the temperature was maintained at 95° C., and ethylene was fed so as to maintain the pressure, and tBA and iBA were fed so as to achieve the ratio: ethylene:tBA:iBA=92.0:5.4:2.6 (molar ratio). Polymerization was conducted for 515 minutes, and then the reaction was terminated, obtaining E/tBA/iBA resin 14. The results are shown in Tables 5 and 7.

2) Preparation of an Ethylene/Acrylic Acid (AA)/Isobutyl Acrylate Terpolymer (E/AA/iBA) by Modification:

Using the above-obtained resin 14, E/AA/iBA resin XIV was obtained in the same manner as in item 2) in Example 1. The results of the measurement of physical properties are shown in Table 8.

In the IR spectrum of the obtained resin XIV, the peak around 1,730 cm$^{-1}$ ascribed to a carbonyl group of an ester was reduced, the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed decomposition of the t-butyl ester and formation of a carboxylic acid.

Comparative Example 4

Comparative Raw Material: Ethylene-Methacrylic Acid Copolymer (E/MAA)

A polar group-containing olefin copolymer (trade name: Nucrel N1560, manufactured by DuPont-Mitsui Polychemicals Co., Ltd.) produced by a high-pressure radical polymerization process, which is a copolymer of ethylene and methacrylic acid, was used as a comparative raw material. The results of the measurement of physical properties are shown in Table 8.

Comparative Example 5

Production of an Ethylene/t-Butyl Acrylate (tBA) Bipolymer (E/tBA):

Into an autoclave having an agitating blade and having an internal volume of 1.6 m³ were charged dried toluene (1,000 liters), 50 g (0.14 mol) of TNOA, and 6.3 kg (49 mol) (predetermined amount) of t-butyl acrylate (tBA: comonomer 1).

While stirring, the temperature in the autoclave was increased to 100° C., and then ethylene was fed to the autoclave, and the autoclave was conditioned so that the pressure became 0.8 MPa.

After completion of the conditioning, B-27DM/Ni catalyst (160 mmol) was fed to initiate copolymerization.

During the reaction, the temperature was maintained at 100° C., and B-27DM/Ni catalyst (160 mmol) was further fed portion by portion two or more times. Ethylene was fed so as to maintain the pressure, and tBA was fed so as to achieve the ratio: ethylene:tBA=94.4:5.6 (molar ratio). Polymerization was conducted for 240 minutes, and then the reaction was terminated, obtaining E/tBA resin 15. The results are shown in Tables 5 and 7.

2) Preparation of an Ethylene/Acrylic Acid (AA) Bipolymer (E/AA):

Using the above-obtained resin 15, E/AA resin XV was obtained in the same manner as in item 2) in Example 1. The results of the measurement of physical properties are shown in Table 8.

In the IR spectrum of the obtained resin XV, the peak around 1,730 cm$^{-1}$ ascribed to a carbonyl group of an ester and the peak around 850 cm$^{-1}$ ascribed to a t-butyl group of a t-butyl ester disappeared, and the peak around 1,700 cm$^{-1}$ ascribed to a carbonyl group of a carboxylic acid (dimer) was increased. This result confirmed that thermal decomposition of the ester was made.

Comparative Example 6

Ethylene-Methacrylic Acid-Isobutyl Acrylate Copolymer (E/MAA/iBA):

As a copolymer of ethylene, methacrylic acid, and isobutyl acrylate (resin XVI), a polar group-containing olefin copolymer (methacrylic acid content: 4 wt %; isobutyl acrylate content: 16 wt %) produced by a high-pressure radical polymerization process was used. The results of the measurement of physical properties are shown in Table 8.

TABLE 1

Results for E/tBA/X terpolymer

|  | Comonomer 1 | Comonomer 2 | Ethylene partial pressure MPa | Comonomer 1 concentration mmol/L | Comonomer 2 concentration mmol/L | Polymerization temperature ° C. | Catalyst amount µmol | Polymerization time min. |
|---|---|---|---|---|---|---|---|---|
| Example 1/Resin 1 | t-Butyl acrylate | n-Butyl acrylate | 0.8 | 60 | 30 | 90 | 200 | 38 |
| Example 2/Resin 2 | t-Butyl acrylate | Isobutyl acrylate | 0.8 | 60 | 30 | 90 | 200 | 45 |
| Example 3/Resin 3 | t-Butyl acrylate | Methyl acrylate | 0.8 | 60 | 30 | 90 | 200 | 75 |
| Example 4/Resin 4 | t-Butyl acrylate | Ethyl acrylate | 0.8 | 60 | 30 | 90 | 200 | 49 |
| Comparative Example 1/Resin 5 | t-Butyl acrylate | 1-Hexene | 0.8 | 60 | 30 | 90 | 200 | 22 |
| Comparative Example 2/Resin 6 | t-Butyl acrylate | Vinyl acetate | 0.8 | 60 | 30 | 90 | 200 | 52 |

TABLE 1-continued

Results for E/tBA/X terpolymer

| | Comonomer 1 | Comonomer 2 | Ethylene partial pressure MPa | Comonomer 1 concentration mmol/L | Comonomer 2 concentration mmol/L | Polymerization temperature °C. | Catalyst amount μmol | Polymerization time min. |
|---|---|---|---|---|---|---|---|---|
| Comparative Example 3/Resin 7 | t-Butyl acrylate | Methyl methacrylate | 0.8 | 60 | 30 | 90 | 200 | 23 |

Polymerization conditions: catalyst: B-270M/NI; toluene (1,000 ml); TNOA (0.2 mmol); nitrogen partial pressure: 0.2 Ma

TABLE 2

Results for E/tBA/X terpolymer

| | Yield g | Vp Activity Kg/mol·h | DSC Tm °C. | DSC ΔH mJ/mg | Crystallinity % | NMR Comonomer 1 content mol % | NMR Comonomer 2 content mol % | Number of methyl branches Number/total 1000 C | GPC Mw*10$^{-4}$ | GPC Mw/Mn |
|---|---|---|---|---|---|---|---|---|---|---|
| Example 1/Resin 1 | 4.8 | 38 | 68.2 | 20.1 | 7 | 5.2 | 4.8 | <0.1 | 1.6 | 2.0 |
| Example 2/Resin 2 | 4.2 | 28 | 65.9 | 15.1 | 5 | 5.8 | 4.2 | <0.1 | 1.6 | 1.9 |
| Example 3/Resin 3 | 4.9 | 19 | 68.7 | 16.4 | 6 | 5.5 | 6.2 | <0.5 | 1.2 | 1.8 |
| Example 4/Resin 4 | 4.7 | 29 | 65.8 | 19.2 | 7 | 6.0 | 5.6 | <0.5 | 1.3 | 1.9 |
| Comparative Example 1/Resin 5 | 6.1 | 83 | 91.7 | 59.7 | 20 | 6.7 | <0.1 | <0.1 | 2.3 | 1.8 |
| Comparative Example 2/Resin 6 | 5.3 | 31 | 90.0 | 60.4 | 21 | 6.8 | <0.1 | <0.1 | 2.1 | 2.0 |
| Comparative Example 3/Resin 7 | 5.9 | 77 | 89.6 | 59.2 | 20 | 6.9 | <0.1 | <0.1 | 2.2 | 1.9 |

TABLE 3

Results for E/AA/X terpolymer

| | DSC Tm °C. | DSC ΔH mJ/mg | Crystallinity % | Phase angle δ G* = 0.1 MP ° |
|---|---|---|---|---|
| Example 1/Resin I | 76.8 | 25.4 | 9 | 70 |
| Example 2/Resin II | 75.7 | 32.8 | 11 | 67 |
| Example 3/Resin III | 73.7 | 31.0 | 11 | 70 |
| Example 4/Resin IV | 74.1 | 32.1 | 11 | 70 |
| Comparative Example 1/Resin V | 96.5 | 80.7 | 28 | 65 |
| Comparative Example 2/Resin VI | 95.4 | 75.3 | 26 | 58 |
| Comparative Example 3/Resin VII | 95.4 | 76.2 | 26 | 66 |

TABLE 4

Results for E/tBA/X terpolymer

| | Comonomer 1 | Comonomer 2 | Ethylene partial pressure MPa | Comonomer 1 concentration mmol/L | Comonomer 2 concentration mmol/L | Polymerization temperature °C. | Catalyst amount μmol | Polymerization time min. |
|---|---|---|---|---|---|---|---|---|
| Example 5/Resin 8 | t-Butyl acrylate | n-Butyl acrylate | 3.0 | 200 | 60 | 90 | 480 | 92 |
| Example 6/Resin 9 | t-Butyl acrylate | n-Butyl acrylate | 3.0 | 200 | 80 | 80 | 480 | 180 |
| Example 7/Resin 10 | t-Butyl acrylate | n-Butyl acrylate | 3.0 | 200 | 50 | 90 | 360 | 88 |
| Example 8/Resin 11 | t-Butyl acrylate | Isobutyl acrylate | 3.0 | 115 | 100 | 90 | 480 | 120 |
| Example 9/Resin 12 | t-Butyl acrylate | Isobutyl acrylate | 3.0 | 190 | 22 | 90 | 480 | 55 |
| Example 10/Resin 13 | t-Butyl acrylate | Isobutyl acrylate | 3.0 | 189 | 7 | 100 | 480 | 29 |

TABLE 5

Results for E/tBA/X terpolymer

|  | Comonomer 1 | Comonomer 2 | Ethylene partial pressure MPa | Comonomer 1 concentration mmol/L | Comonomer 2 concentration mmol/L | Polymerization temperature °C. | Catalyst amount mmol | Polymerization time min. |
|---|---|---|---|---|---|---|---|---|
| Example 11/Resin 14 | t-Butyl acrylate | Isobutyl acrylate | 0.8 | 35 | 12 | 95 | 1,500 | 515 |
| Comparative Example 5/Resin 15 | t-Butyl acrylate | — | 0.8 | 49 | — | 100 | 320 | 240 |

TABLE 6

Results for E/tBA/X terpolymer

|  | Yield g | Vp Activity Kg/mol·h | DSC Tm °C. | DSC ΔH mJ/mg | DSC Crystallinity % | NMR Comonomer 1 content mol % | NMR Comonomer 2 content mol % | NMR Number of methyl branches Number/total 1000 C | GPC Mw*10$^{-4}$ | GPC Mw/Mn |
|---|---|---|---|---|---|---|---|---|---|---|
| Example 5/Resin 8 | 61.7 | 84 | 82.4 | 39.7 | 14 | 5.3 | 2.7 | no data | 3.0 | 1.9 |
| Example 6/Resin 9 | 59.5 | 41 | 80.2 | 38 | 13 | 5.2 | 3.6 | 0.2 | 3.6 | 1.9 |
| Example 7/Resin 10 | 57.9 | 110 | 87.2 | 52.6 | 18 | 5.4 | 1.9 | 0.5 | 3.4 | 1.9 |
| Example 8/Resin 11 | 54.0 | 56 | 90.3 | 47.6 | 16 | 3.2 | 3.8 | 0.5 | 3.2 | 1.9 |
| Example 9/Resin 12 | 65.0 | 148 | 92.5 | 62.7 | 21 | 5.3 | 1.0 | 0.6 | 3.5 | 1.9 |
| Example 10/Resin 13 | 61.9 | 267 | 94.5 | 73.7 | 25 | 5.5 | 0.5 | 0.7 | 2.6 | 1.9 |

TABLE 7

Results for E/tBA/X terpolymer

|  | Yield g | Vp Activity Kg/mol·h | DSC Tm °C. | DSC ΔH mJ/mg | DSC Crystallinity % | NMR Comonomer 1 content mol % | NMR Comonomer 2 content mol % | NMR Number of methyl branches Number/total 1000 C | GPC Mw*10$^{-4}$ | GPC Mw/Mn |
|---|---|---|---|---|---|---|---|---|---|---|
| Example 11/Resin 14 | 75,000 | 6 | 80.5 | 33.9 | 12 | 5.4 | 2.3 | <0.1 | 2.9 | 3.6 |
| Comparative Example 5/Resin 15 | 48,000 | 38 | 94.1 | 77.5 | 26 | 5.6 | — | 1.0 | 2.2 | 2.3 |

TABLE 8

|  | Raw material resin composition A/B/C mol/mol/mol | MFR 190 deg. 2.15 kg dg/min | Tensile modulus MPa | Tensile stress at break MPa | Tensile elongation at break % | Tensile impact strength kJ/m2 | Crystallinity % | Melting point Tm °C. | Phase angle δ G = 0.1 MPa ° |
|---|---|---|---|---|---|---|---|---|---|
| Example 5/Resin VIII | E/AA/nBA = 92/5.3/2.7 | no data | 45 | 25 | 546 | 705 | 20 | 87 | 70 |
| Example 6/Resin IX | E/AA/nBA = 91.2/5.2/3.6 | 41 | 35 | 31 | 606 | 1078 | 17 | 83 | 58 |
| Example 7/Resin X | E/AA/nBA = 92.6/5.4/2.0 | 34 | 54 | 29 | 554 | 659 | 23 | 90 | 61 |
| Example 8/Resin XI | E/AA/iBA = 93.0/3.2/3.6 | 68 | 45 | 22 | 600 | 722 | 22 | 91 | 68 |
| Example 9/Resin XII | E/AA/iBA = 93.7/5.3/1.0 | 33 | 74 | 31 | 562 | 702 | 27 | 96 | 68 |
| Example 10/Resin XIII | E/AA/iBA = 94.0/5.5/0.5 | 73 | 172 | 22 | 395 | 237 | 30 | 98 | 69 |
| Example 11/Resin XIV | E/AA/iBA = 92.3/5.4/2.3 | 81 | 51 | 27 | 636 | 497 | 17 | 88 | 64 |
| Comparative Example 4 | E/MAA = 94.6/5.4 | 53 | 59 | 24 | 370 | 379 | 20 | 89 | 48 |

TABLE 8-continued

|  | Raw material resin composition A/B/C mol/mol/mol | MFR 190 deg. 2.15 kg dg/min | Tensile modulus MPa | Tensile stress at break MPa | Tensile elongation at break % | Tensile impact strength kJ/m2 | Crystal- linity % | Melting point Tm °C. | Phase angle δ G = 0.1 MPa ° |
|---|---|---|---|---|---|---|---|---|---|
| Comparative Example 5/Resin XV | E/AA = 94.4/5.6 | 128 | 301 | 15 | 179 | 120 | 33 | 100 | 52 |
| Comparative Example 6/Resin XVI | E/MAA/iBA = 94.4/1.5/4.1 | 27 | 26 | 16 | 636 | 575 | 23 | 87 | 45 |

From Table 2, it is apparent that, in the case where copolymerization is conducted under the same conditions for charging the materials, resins 1 to 4 in Examples 1 to 4, which are copolymers using an acrylate as comonomer 2, have extremely low crystallinity and high transparency, as compared to resins 5 to 7 in Comparative Examples 1 to 3, which are copolymers using an α-olefin, a vinyl ester, or methyl methacrylate as comonomer 2. When transparency equivalent to that of resins 1 to 4 is achieved using an α-olefin, a vinyl ester, or methyl methacrylate as comonomer 2, a large amount of the comonomer is required, and thus, as compared to an acrylate, the above comonomer is relatively inferior from an economical point of view.

From Table 3, it is apparent that resins I to IV which are acid copolymers obtained from resins 1 to 4 in Examples 1 to 4 have extremely low crystallinity and high transparency, as compared to resins V to VII which are acid copolymers obtained from resins 5 to 7 in Comparative Examples 1 to 3. From this, it is considered that, after changed to acid copolymers, resins 1 to 4 maintain high transparency. Further, resins I to IV have a phase angle δ larger than that of resins V to VII, and therefore are considered to exhibit more excellent mechanical strength. As apparent from the above, resins I to IV are improved not only in mechanical strength but also in transparency, as compared to a known resin.

In Table 8, as compared to the copolymer in Comparative Example 4, which is produced by a radical polymerization method, resins VIII to XII and XIV which are acid copolymers obtained from Examples 5 to 9 and 11 have high tensile elongation at break and high tensile impact strength. Further, resins VIII, IX, X, XII, and XIV have high tensile stress at break. Further, resins IX and XIV have low crystallinity and high transparency. In addition, it is apparent that resin XIII which is an acid copolymer obtained from Example 10 has a tensile modulus even higher than that in Comparative Example 4, and thus has excellent balance of physical properties. Resins VIII to XIV have a phase angle larger than that of Comparative Example 4, and therefore are considered to exhibit excellent mechanical strength. As apparent from the above, Examples 5 to 11 are relatively excellent in the balance between the rigidity, toughness, and transparency, as compared to Comparative Example 4.

In Table 8, as compared to resin XV which is an acid copolymer obtained from Comparative Example 5, resins VIII to XIV which are acid copolymers obtained from Examples 5 to 11 have high tensile stress at break, high tensile elongation at break, high tensile impact strength, low crystallinity, and large phase angle. As apparent from the above, Examples 5 to 11 are relatively excellent in the balance between the rigidity, toughness, and transparency, as compared to Comparative Example 5.

In Table 8, as compared to resin XVI in Comparative Example 6, which is produced by a radical polymerization method, resins VIII to XIV which are acid copolymers obtained from Examples 5 to 11 have high tensile modulus, high tensile stress at break, and large phase angle. Further, resins VIII to XII have high tensile impact strength. In addition, resins VIII, IX, XI, and XIV have low crystallinity and high transparency. Therefore, Examples 5 to 11 are relatively excellent in the balance between the elasticity, rigidity, and transparency, as compared to Comparative Example 6.

Figure 2:
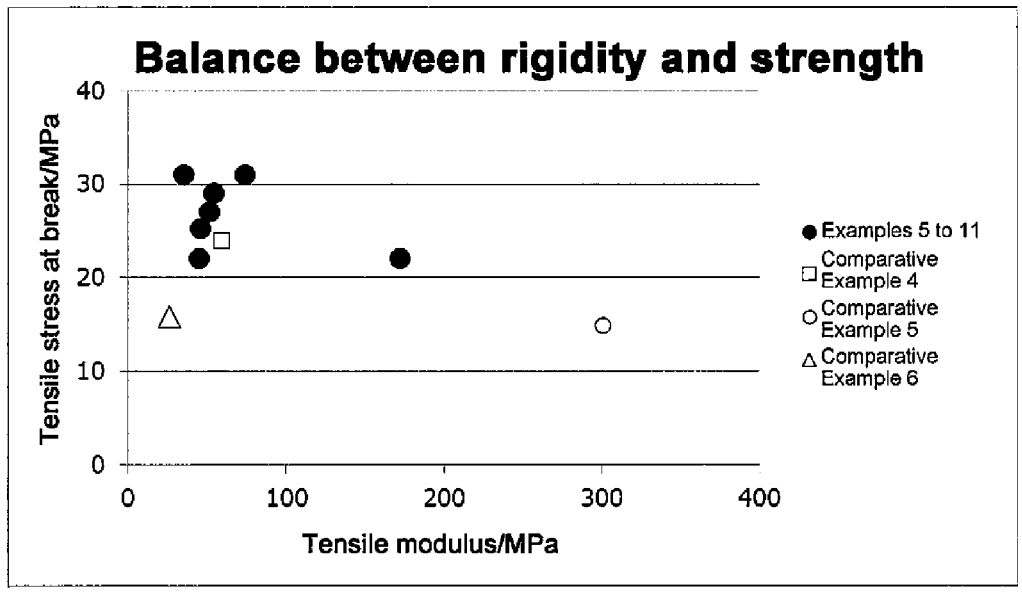
FIG. 2 A diagram showing a balance between the rigidity and the strength with respect to the copolymers in the Examples and Comparative Examples.

The results of the measurement of physical properties with respect to the copolymers obtained in the Examples and Comparative Examples are shown in FIGS. 1 and 2. As can be seen from these figures, the samples in the Comparative Examples exhibit physical properties such that any one of the rigidity, strength, and toughness is even lower than those of the other samples, whereas the samples in the Examples have excellent balance of values in the all physical properties. As apparent from the above, the copolymer of the present invention has such excellent balance of physical properties that it is useful as a material.

The invention claimed is:

1. A polar group-containing multi-component olefin copolymer comprising:
   structural units (A) derived from ethylene or an α-olefin,
   structural units (B) having a carboxyl group or a structure which forms a carboxyl group by an elimination reaction due to heat or an acid, and
   structural units (C) derived from acrylic acid, which do not have a carboxyl group, and which do not undergo an elimination reaction due to heat or an acid under the same conditions as those for the elimination reaction due to heat or an acid in which the structural units (B) form a carboxyl group, and a ratio of weight average molecular weight/number average molecular weight (Mw/Mn), as measured by gel permeation chromatography (GPC), is 1.5 to 4.0.

2. The polar group-containing multi-component olefin copolymer according to claim 1, which comprises:
   the structural units (A) which are at least one type of structural units selected from the group consisting of structural units derived from ethylene and structural units derived from an α-olefin having 3 to 20 carbon atoms,
   the structural units (B) which are at least one type of structural units selected from the group consisting of structural units (b-1) derived from a polar group-containing olefin monomer represented by the general formula (1) below, and structural units (b-2) derived from a polar group-containing olefin monomer represented by the general formula (2) below, and
   the structural units (C) which are derived from a polar group-containing olefin monomer represented by the general formula (3) below:

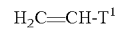

(1)

wherein, in the general formula (1), $T^1$ is:
a carboxyl group,
an alkoxycarbonyl group having 2 to 20 carbon atoms and being substituted with at least one carboxyl group,
a hydrocarbon group having 1 to 30 carbon atoms and being substituted with at least one carboxyl group,
an alkoxy group having 1 to 20 carbon atoms and being substituted with at least one carboxyl group,
an acyloxy group having 1 to 20 carbon atoms and being substituted with at least one carboxyl group,
a substituted amino group having 1 to 12 carbon atoms and being substituted with at least one carboxyl group, or
a substituted silyl group having 1 to 18 carbon atoms and being substituted with at least one carboxyl group,

$$H_2C=CH-X-COOT^2 \qquad (2)$$

wherein, in the general formula (2), $T^2$ is a substituent selected from the group consisting of:
a t-butyl group,
an allyl group,
a benzyl group, and
a group represented by: $-CR^aR^b-O-R^c$ wherein $R^a$ is a hydrogen atom or a hydrocarbon group having 1 to 10 carbon atoms, and each of $R^b$ and $R^c$ is a hydrocarbon group having 1 to 10 carbon atoms, wherein $R^b$ and $R^c$ optionally together form a divalent hydrocarbon group having 1 to 8 carbon atoms and optionally having at least one methylene group replaced by an ether group or an ester group, and each of $R^b$ and $R^c$ optionally has a hydrocarbon substituent having 1 to 4 carbon; atoms; and
X is a direct bond or $-COO-R'-$ wherein $R'$ is a divalent hydrocarbon group having 1 to 30 carbon atoms,

$$H_2C=CH-COOCHZ^1Z^2 \qquad (3)$$

wherein, in the general formula (3), each of $Z^1$ and $Z^2$ is independently a substituent selected from the group consisting of:
a hydrogen atom,
a hydroxyl group,
a hydrocarbon group having 1 to 10 carbon atoms and being substituted with a hydroxyl group,
an alkyl group having 1 to 30 carbon atoms,
a hydrocarbon group having 3 to 20 carbon atoms and being substituted with an alkoxycarbonyl group having 2 to 10 carbon atoms,
a hydrocarbon group having 3 to 20 carbon atoms and being substituted with an acyloxy group having 2 to 10 carbon atoms,
a hydrocarbon group having 2 to 20 carbon atoms and being substituted with a substituted amino group having 1 to 12 carbon atoms,
a hydrocarbon group having 4 to 30 carbon atoms and being substituted with a substituted silyl group having 3 to 18 carbon atoms,
an alkoxycarbonyl group having 2 to 20 carbon atoms,
an acyloxy group having 2 to 10 carbon atoms,
an amino group,
a substituted amino group having 1 to 12 carbon atoms,
a substituted silyl group having 3 to 18 carbon atoms, and
a hydrocarbon group having 1 to 20 carbon atoms and being substituted with a halogen,
wherein $Z^1$ and $Z^2$ are optionally bonded together to form a ring.

3. The polar group-containing multi-component olefin copolymer according to claim 1, wherein a number of methyl branches contained in the polar group-containing multi-component olefin copolymer is 5 or less per 1,000 carbon atoms.

4. The polar group-containing multi-component olefin copolymer according to claim 1, which has a phase angle δ of 50 to 75 degrees at a complex modulus absolute value G* of 0.1 MPa, as measured by a rotational rheometer.

5. The polar group-containing multi-component olefin copolymer according to claim 1, which contains the structural units (B) in an amount of 0.1 to 20.0 mol %.

6. The polar group-containing multi-component olefin copolymer according to claim 1, wherein a melting point (Tm,° C.) as measured by differential scanning calorimetry (DSC) and a total content [Y] (mol %) of the structural units (B) and the structural units (C) derived from the polar group-containing olefin monomer satisfy the following formula (I):

$$50<Tm<-3.74\times[Y]+130 \qquad (I).$$

7. The polar group-containing multi-component olefin copolymer according to claim 2, wherein each of the $Z^1$ and $Z^2$ in the general formula (3) is independently a substituent selected from the group consisting of:
a hydrogen atom,
an alkyl group having 1 to 30 carbon atoms,
a hydrocarbon group having 3 to 20 carbon atoms and being substituted with an alkoxycarbonyl group having 2 to 10 carbon atoms,
an alkoxycarbonyl group having 2 to 20 carbon atoms,
an acyloxy group having 2 to 10 carbon atoms, and
a hydrocarbon group having 1 to 20 carbon atoms and being substituted with a halogen.

8. The polar group-containing multi-component olefin copolymer according to claim 2, wherein the $T^2$ in the general formula (2) is a substituent selected from the group consisting of:
a t-butyl group, and
a group represented by: $-CR^aR^b-O-R^c$.

9. The polar group-containing multi-component olefin copolymer according to claim 2, wherein the $T^2$ in the general formula (2) is a t-butyl group.

10. The polar group-containing multi-component olefin copolymer according to claim 2, which contains the structural units (C) derived from the polar group-containing olefin monomer in an amount of 0.5 to 20.0 mol %.

11. The polar group-containing multi-component olefin copolymer according to claim 2, which further contains a transition metal element belonging to Group 10 of the Periodic Table in an amount of 20,000 ug/g or less, as measured by ICP-OES.

12. The polar group-containing multi-component olefin copolymer according to claim 11, wherein the transition metal belonging to Group 10 of the Periodic Table is nickel or palladium.

13. The polar group-containing multi-component olefin copolymer according to claim 2, wherein the structural units (B) are at least one type of structural units selected from the group consisting of the structural units (b-2) derived from a polar group-containing olefin monomer represented by the general formula (2).

14. A method for producing a polar group-containing multi-component olefin copolymer, comprising:
structural units (A) derived from ethylene or an α-olefin,
structural units (B) having a carboxyl group, and structural units (C) derived from acrylic acid, which do not have a carboxyl group, and which do not undergo an elimination reaction due to heat or an acid under the same conditions as those for the elimination reaction due to heat or an acid in which the structural units (B) form a carboxyl group, and the ratio of weight average molecular weight/number average molecular weight (Mw/Mn), as measured by gel permeation chromatography (GPC), is 1.5 to 4.0, the method comprising subjecting the polar group-containing multi-component olefin copolymer according to claim 13 to thermal decomposition at 80 to 350° C. or subjecting the polar group-containing multi-component olefin copolymer to hydrolysis using an acid catalyst.

* * * * *

UNITED STATES PATENT AND TRADEMARK OFFICE
CERTIFICATE OF CORRECTION

PATENT NO. : 12,116,474 B2
APPLICATION NO. : 17/425111
DATED : October 15, 2024
INVENTOR(S) : Satou et al.

Page 1 of 1

It is certified that error appears in the above-identified patent and that said Letters Patent is hereby corrected as shown below:

In the Claims

Column 55, Line 31 (Claim 2, Line 48), please change "4 carbon; atoms;" to --4 carbon atoms;--.

Signed and Sealed this
Eleventh Day of February, 2025

Coke Morgan Stewart
*Acting Director of the United States Patent and Trademark Office*